(12) United States Patent
Lu et al.

(10) Patent No.: US 8,968,595 B2
(45) Date of Patent: Mar. 3, 2015

(54) METHODS FOR RECYCLING LIQUID CRYSTAL AND FORMING REFORMULATED LIQUID CRYSTAL MIXTURES

(75) Inventors: Chien-Wei Lu, Hsinchu (TW); Huan-Yi Hung, Changhua County (TW); Tsung-Chou Hsu, Changhua County (TW); Chia-Lin Tsai, New Taipei (TW); Yao-Ting Huang, Tainan (TW); Meng-Yuh Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/225,102

(22) Filed: Sep. 2, 2011

(65) Prior Publication Data

US 2013/0056679 A1 Mar. 7, 2013

(51) Int. Cl.
 *C09K 19/02* (2006.01)
 *C09K 19/04* (2006.01)
 *B01D 11/04* (2006.01)
 *C09K 19/00* (2006.01)

(52) U.S. Cl.
 CPC ............ *B01D 11/0492* (2013.01); *C09K 19/00* (2013.01)
 USPC .................................................. 252/299.01

(58) Field of Classification Search
 CPC . C09K 19/02; C09K 19/04; C09K 2019/0466
 USPC .................................................. 252/299.01
 See application file for complete search history.

(56) References Cited

U.S. PATENT DOCUMENTS

| 6,780,477 | B2 | 8/2004 | Kirsch et al. | |
| 6,896,939 | B2 | 5/2005 | Klasen-Memmer et al. | |
| 2002/0119262 | A1* | 8/2002 | Hirschmann et al. | 428/1.1 |
| 2003/0017279 | A1* | 1/2003 | Klasen-Memmer et al. | 428/1.1 |
| 2006/0198968 | A1 | 9/2006 | Goto et al. | |
| 2009/0194739 | A1* | 8/2009 | Wittek et al. | 252/299.61 |
| 2011/0149227 | A1 | 6/2011 | Saito et al. | |

FOREIGN PATENT DOCUMENTS

| CN | 1952743 A | * | 4/2007 |
| DE | 198 10 816 A1 | | 9/1999 |
| DE | 10 2005 027 762 A1 | | 1/2006 |
| JP | 2002-258230 | | 9/2002 |
| JP | 2004-137467 | | 5/2004 |
| JP | 2006091266 A | * | 4/2006 |
| JP | 2006-198492 | | 8/2006 |
| KR | 10-2010-0019932 | | 2/2010 |

(Continued)

OTHER PUBLICATIONS

English translation by computer for CN100417982 (equivalent CN 1952743), 2008.*

(Continued)

*Primary Examiner* — Shean C Wu
(74) *Attorney, Agent, or Firm* — Finnegan, Henderson, Farabow, Garrett & Dunner LLP

(57) ABSTRACT

Provided are methods for recycling liquid crystal comprising: receiving at least one liquid crystal mixture; and forming a reformulated liquid crystal mixture using at least one portion of the at least one liquid crystal mixture. Also provided are reformulated liquid crystal mixtures comprising at least one recycled liquid crystal mixture and liquid crystals displays devices having one or more reformulated liquid crystal mixtures.

26 Claims, 20 Drawing Sheets

(56) References Cited

FOREIGN PATENT DOCUMENTS

| | | |
|---|---|---|
| KR | 10-0960580 | 6/2010 |
| TW | I294419 | 3/2008 |
| TW | 201006541 | 2/2010 |
| TW | I320801 | 2/2010 |
| TW | I327592 | 7/2010 |
| WO | WO 2007099352 A1 * | 9/2007 |

OTHER PUBLICATIONS

English translation for DE 19810816 by machine provided by EPO, 2013.*

English translation for JP 2006-198492 by computer, http://www4.ipdl.inpit.go.jp/Tokujitu/PAJdetail.ipdl?N0000=60&N0120=01&N2001=2&N3001=2006-198492.*

English traalstiom for JP 2004-137467 by computer, http://www4.ipdl.inpit.go.jp/Tokujitu/PAJdetail.ipdl?N0000=60&N0120=01&N2001=2&N3001=2004-137467.*

A.J. Hunt et al., "Extraction of liquid crystals from flat panel display devices using both liquid and supercritical carbon dioxide," 11th International Supercritical Conference Proceedings, May 2008.

A.J. Hunt et al., "Advanced materials from LCD waste," 14th Annual Green Chemistry & Engineering Conference. Jun. 23, 2010.

A.J. Hunt, "Reusing LCD televisions for medical breakthroughs," Abstract, 14th Annual Green Chemistry & Engineering Conference, Jun. 23, 2010 (retrieved from http://www.acs.org/content/acs/en/pressroom/newsreleases/2010/june/14th-annual-green-chemistry-engineering-conference.html).

European search report mailed from European Patent Office on May 14, 2013, for European Patent Application No. 11183288.7.

Japanese Office Action mailed from the Japanese Patent Office on Sep. 10, 2013, for Japanese Patent Application No. 2012-188843.

Becker, W., Liquid Crystals in Liquid Crystal Displays (LCDs) Basics, Safety and End-of-Life Aspects [Powerpoint presentation]. Retrieved from http://www.asekol.sk/sk/download/akcie/werner_becker_lcs_in_lcds_basics_safety_end_of_life.pdf., at pp. 1-24 (May 3, 2011).

Martin, R. et al., New EU Legislation (WEEE) Compliant Recovery Processes for LCDs (2008).

* cited by examiner

METHODS FOR RECYCLING LIQUID CRYSTAL AND FORMING REFORMULATED LIQUID CRYSTAL MIXTURES

TECHNICAL FIELD

The present disclosure relates to methods for recycling liquid crystal and reformulated liquid crystal mixtures.

BACKGROUND

Liquid crystal displays (LCDs) have various applications and may be commonly used in various electronics and equipment, such as notebook computers, smart phones, desktop monitors, mobile phones, televisions, instruments, toys, digital cameras, audio-video equipment, appliances, and automobiles.

While some electronics or other parts of devices incorporating LCDs are commonly recycled, the liquid crystal materials in LCDs frequently are not. One of the reasons is the potential difficulties and challenges in dealing with liquid crystal materials having a diverging range of physical, chemical, and/or other characteristics. However, inadequate disposals of liquid crystal materials not only constitute waste of resources but also may impact our environment.

Therefore, it is desirable to provide methods for recycling liquid crystal, to provide recycled liquid crystal, and to develop liquid crystal displays using the recycled liquid crystal.

SUMMARY

Provided are methods for recycling liquid crystal, and in some embodiments, the methods comprising: receiving a liquid crystal mixture; conducting at least one separation process to separate a first liquid crystal group from the liquid crystal mixture; conducting at least one additional separation process to separate a second liquid crystal group from the remaining of the liquid crystal mixture; and forming a reformulated liquid crystal mixture using the first liquid crystal group and the second liquid crystal group.

In some embodiments, the methods comprising: receiving a first liquid crystal mixture and a second liquid crystal mixture; conducting at least one separation process to separate at least one first liquid crystal group from the first liquid crystal mixture; conducting at least one additional separation process to separate at least one second liquid crystal group from the second liquid crystal mixture; and forming a reformulated liquid crystal mixture using the at least one first liquid crystal group and the at least one second liquid crystal group.

In also some other embodiments, the method comprising: receiving a first liquid crystal mixture and a second liquid crystal mixture; conducting at least one separation process to separate at least one liquid crystal group from the first liquid crystal mixture; and forming a reformulated liquid crystal mixture using the at least one liquid crystal group and the second liquid crystal mixture.

In further some other embodiments, the method comprising: receiving a first liquid crystal mixture and a second liquid crystal mixture; conducting at least one mapping process; and forming a reformulated liquid crystal mixture comprising at least one portion of the first liquid crystal mixture and at least one portion of the second liquid crystal mixture.

Also provided are reformulated liquid crystal mixtures, for example, in some embodiments, the reformulated liquid crystal mixtures comprising: a first liquid crystal group separated from a recycled liquid crystal mixture; and a second liquid crystal group separated from a residual of the recycled liquid crystal mixture after the first liquid crystal group is separated from the recycled liquid crystal mixture.

Further provided are liquid crystal display devices having one or more reformulated liquid crystal mixtures.

DESCRIPTION OF THE EMBODIMENTS

Embodiments disclosed herein may provide methods for recycling liquid crystal, reformulated liquid crystal mixtures, and liquid crystal display devices having one or more reformulated liquid crystal mixtures. A method for recycling liquid crystal may include receiving a liquid crystal mixture, separating at least one liquid crystal group from the liquid crystal mixture, and forming a reformulated liquid crystal using the at least one liquid crystal group.

Figure 1:
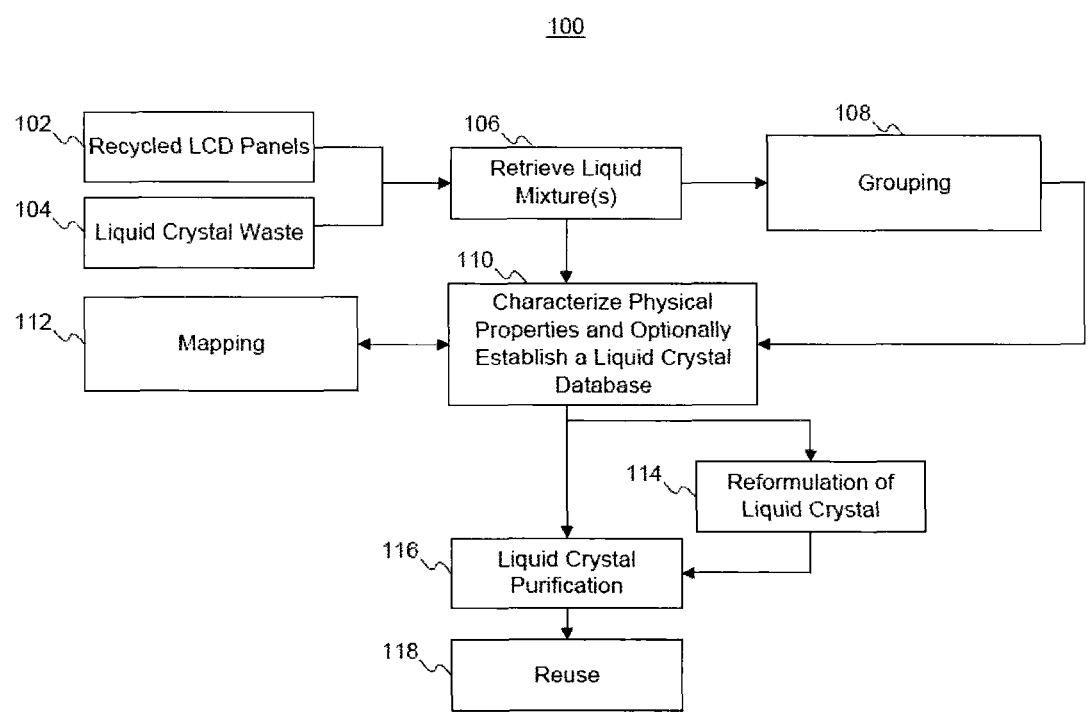
FIG. 1 illustrates an exemplary process for recycling liquid crystal consistent with the disclosed embodiments.

FIG. 1 (100) illustrates exemplary processes for recycling liquid crystal.

A. Retrieving Liquid Crystal Mixture(s)

Liquid crystal mixtures being processed for recycling may come from various sources. In some embodiments, liquid crystal mixture(s) to be recycled or processed may come from LCDs identified as defective, less desirable, non-functional, etc. during the manufacturing process or after being used (102). As an example, a liquid crystal mixture may be retrieved from waste LCD panels. In some other embodiments, liquid crystal mixture(s) to be recycled may be those disposed from the LCD manufacturers or from LCD production lines (104). As an example, a liquid crystal mixture may be identified by manufactures as disfavored or not ideal (e.g., contaminated) for the production of LCDs.

Generally, liquid crystal mixtures from the LCD manufacturers or LCD production lines (104) may require less processing steps for reformulation than the liquid crystal mixtures retrieved from waste LCDs. In some embodiments, liquid crystal mixtures from the LCD manufacturers or LCD production lines may be used directly for reformulation after ascertaining some of the mixtures' physical properties, e.g., flow viscosity ($\eta$), dielectric anisotropy ($\Delta\in$), birefringence ($\Delta n$), clearing point ($T_{NI}$), etc.

For those from waste LCDs, many different types of LCDs exist on the market. Depending on the types of liquid crystal compounds contained in the device, LCDs can be categorized into either positive-type or negative-type LCDs. Positive-type LCDs may contain liquid crystal compounds having positive dielectric anisotropy (i.e., $\Delta\in>0$), and based on the different driver models used for the liquid crystals, the positive LCDs may be categorized into STN, TN, IPS, cholesterol displays, etc. For example, TN displays contain liquid crystal compounds which twist and untwist at varying degrees to allow light to pass through. When no voltage is applied to a TN display, the light is polarized to pass through the display creating a transparent display. Negative-type LCDs such as VA displays may contain liquid crystal compounds having negative dielectric anisotropy (i.e., $\Delta\in<0$). Further as an example, VA displays contain liquid crystal compounds naturally exist in a vertical state. When no voltage is applied, the liquid crystal compounds within the VA display remain perpendicular to the substrate creating a black display. Because the opposite $\Delta\in$ values in the positive-type and native-type LCDs will cancel each other out when the two different types of LCDs are mixed together, in one embodiment, before retrieving liquid crystals compounds, the positive-type and the negative-type LCDs are collected separately first based on whether light will pass through the LCD panels having a polarizer when no voltage is applied to the panels (i.e., panels that allow the light to pass through are positive-type LCDs, and panels that does not allow the light to pass through are negative-type LCDs.)

There are various processes for retrieving liquid crystal mixtures from the LCDs. For example, in one embodiment, the process for retrieving the liquid crystal mixture from LCDs may include (1) crushing the LCD panels; (2) separating two glass substrates to expose a liquid crystal mixture; (3) using organic solvents such as acetone or hexane to separate the liquid crystal mixture from the glass substrates; (4) evaporating organic solvents; and (5) removing impurities such as sealers, resins, and/or color filters from the liquid crystal mixture by applying one or more separation or purification process, such as absorption.

The liquid crystal mixture retrieved from the various sources illustrated above may contain more than one type of liquid crystal compounds and/or tens, hundreds, or tens of hundreds of liquid crystal compounds. In some embodiments, the liquid crystal mixture may be used directly (for example, in FIG. 1, from step 106 directly to steps 110, 116, 118, etc.), after ascertaining its physical properties (e.g., $\eta$, $\Delta\in$, $\Delta n$, $T_{NI}$, etc).

In some other embodiments, the liquid crystal mixture may be separated into two or more groups of liquid crystal groups for reformulation (e.g., in FIG. 1, from step 106 to step 108, and then to steps 110, 114, etc.). The process for separating the liquid crystal mixture into more than one group of liquid crystal group is herein referred to as "grouping," which can be applied at step 108. Embodiments regarding the grouping process are provided as follows.

B. Grouping

The liquid crystal mixture may be separated into more than one groups of liquid crystal group by using at least one separation process, which can be performed at step 108 of FIG. 1. For example, in one embodiment, at least one separation process is conducted to separate a first liquid crystal group from the liquid crystal mixture, and the remaining mixture may be a second liquid crystal group or may be further separated into two or more groups. For example, additional separation process(es), either similar or dissimilar ones, may be conducted to separate a second liquid crystal group from the remaining mixture. In another embodiment, a first separation process may be conducted to separate a first liquid crystal group from the liquid crystal mixture, and second and third separation processes may be conducted to respectively separate a second and a third liquid crystal groups from the remaining liquid crystal mixture, wherein the first, the second, and the third separate processes can be the same, similar to, or different from each other.

In some embodiments, the liquid crystal mixture may be separated into at least two, three, four, five, six, seven, eight, or more groups of liquid crystal groups. Each liquid crystal group separated from the liquid crystal mixture may have physical properties (e.g., $\eta$, $\Delta\in$, $\Delta n$, $T_{NI}$, etc) different from the remaining liquid crystal mixture and other groups. For example, the first liquid crystal group separated from the liquid crystal mixture may have physical properties different from the liquid crystal mixture and the second liquid (or the third, the fourth, the fifth etc.) crystal group separated from the remaining of the liquid crystal mixture. As a non-limiting example, the first liquid crystal group separated from the liquid crystal mixture may have a $\eta$, $\Delta\in$, $\Delta n$, or $T_{NI}$ higher or lower than the liquid crystal mixture or the second (or the third, fourth, fifth, etc.) liquid crystal group separated from the remaining liquid crystal mixture. The liquid crystal group(s) separated from the liquid crystal mixture may include more than one liquid crystal compound.

In some embodiments, a separation process may be chosen from distillation processes, liquid-liquid extractions, and column chromatographies. For example, distillation processes, such as low-pressure distillation, may be used to separate liquid crystal groups or diluents with low boiling point; liquid-liquid extractions using, for instance, polar solvents, may be used to extract liquid crystal compounds with high $\Delta\in$; and column chromatographies may be used to separate liquid crystal groups with high $T_{NI}$.

In some embodiments, at least one liquid-liquid extraction process is conducted to separate at least one liquid crystal group from the liquid crystal mixture. In one embodiment, at least one liquid-liquid extraction process is conducted to separate at least one liquid crystal group from the liquid crystal mixture, wherein the at least one liquid crystal group comprises at least one liquid crystal compound having at least one $CF_2O$ bridge, such as liquid crystal compounds of formula I:

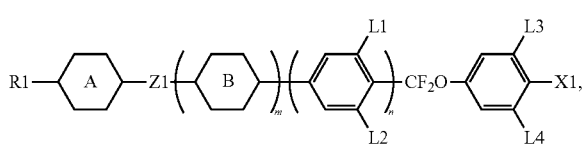

wherein R1 is chosen from alkyl having 1 to 12 carbons, alkoxy having 1 to 12 carbons, and alkenyl having 2 to 12 carbons; ring A and ring B are each independently chosen from 1,4-cycloheylene and 1,4-phenylene; Z1 is independently chosen from a single bond, ethylene, methyleneoxy, carbonyloxy or $C_2F_4$; L1, L2, L3 and L4 are each independently chosen from hydrogen and halogen; X1 is independently chosen from hydrogen, halogen, halogenated alkyl, alkenyl, and alkoxy having 1 to 6 carbons; m and n are each independently chosen from 0, 1, and 2.

In another embodiment, at least one liquid-liquid extraction process is conducted to separate at least one liquid crystal group from the liquid crystal mixture, wherein the at least one liquid crystal group may include at least one liquid crystal compound having at least one $CF_2O$ bridge and present in an amount ranging from about 20% to about 100% by weight, relative to the total weight of the at least one liquid crystal group.

In yet another embodiment, at least one column chromatography is conducted to separate at least one liquid crystal group from the liquid crystal mixture. In one embodiment, at least one column chromatography is conducted to separate at least one liquid crystal group from the liquid crystal mixture, wherein the at least one liquid crystal group comprises at least one liquid crystal compound having at least four cyclic rings, such as liquid crystal compounds of formula II:

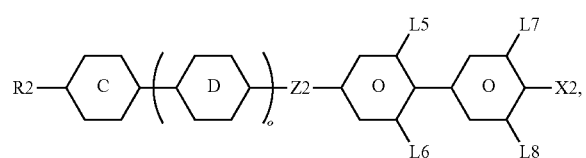

wherein R2 is independently chosen from alkyl having 1 to 12 carbons, alkoxy having 1 to 12 carbons, and alkenyl having 2 to 12 carbons; ring C and ring D are each independently chosen from 1,4-cycloheylene and 1,4-phenylene; Z2 is independently chosen from a single bond, ethylene, methyleneoxy, carbonyloxy, and $C_2F_4$; L5, L6, L7 and L8 are each independently chosen from hydrogen and halogen; X2 is independently chosen from hydrogen, halogen, halogenated alkyl, alkenyl, and alkoxy having 1 to 6 carbons; o is independently chosen from 1, 2, and 3.

In another embodiment, at least one column chromatography is conducted to separate at least one liquid crystal group from the liquid crystal mixture, wherein the at least one liquid crystal group comprises at least one liquid crystal compound having at least four cyclic groups and present in an amount ranging from about 20% to about 100% by weight, relative to the total weight of the at least one liquid crystal group.

In yet another embodiment, at least one column chromatography is conducted to separate at least one liquid crystal group from the liquid crystal mixture, wherein the at least one liquid crystal group comprises at least one liquid crystal compound comprising at least one benzene ring and halogen atoms at the ortho and meta positions of the at least one benzene ring, for examples, the at least liquid crystal compound may be chosen from liquid-crystal compounds of formula III:

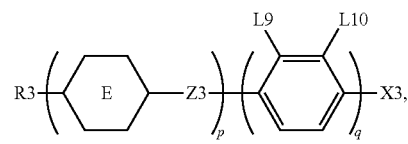

wherein R3 is independently chosen from alkyl having 1 to 12 carbons, alkoxy having 1 to 12 carbons, and alkenyl having 2 to 12 carbons; ring E is independently chosen from 1,4-cycloheylene and 1,4-phenylene; Z3 is independently chosen from a single bond, ethylene, methyleneoxy, and carbonyloxy; L9 and L10 are each independently chosen from halogen; X3 is independently chosen from hydrogen, halogen, halogenated alkyl, alkenyl, and alkoxy having 1 to 6 carbons; p and q are each independently chosen from 1, 2, and 3.

In yet another embodiment, at least one column chromatography is conducted to separate at least one liquid crystal group from the liquid crystal mixture, wherein the at least one liquid crystal group comprises at least one liquid crystal compound having at least one benzene ring and halogen atoms at the ortho and meta positions of the at least one benzene ring and present in an amount ranging from about 50% to about 100% by weight, relative to the total weight of the at least one liquid crystal group.

In some embodiments, at least one low pressure distillation process is conducted to separate at least one liquid crystal group from the liquid mixture. In one embodiment, at least one low pressure distillation process is conducted to separate at least one liquid crystal group from the liquid crystal mixture, wherein the at least one liquid crystal group comprises at least one liquid crystal compound having two or three hydrocarbon cyclic rings, such as liquid crystal compounds of formula IV:

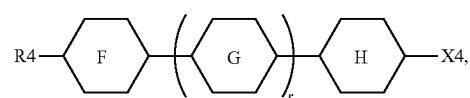

wherein R4 is independently chosen from alkyl having 1 to 12 carbons, alkoxy having 1 to 12 carbons, and alkenyl having 2 to 12 carbons; ring F, ring G and ring H are each independently chosen from 1,4-cycloheylene and 1,4-phenylene; X4 is independently chosen from hydrogen, halogen, halogenated alkyl, alkenyl, and alkoxy having 1 to 6 carbons; r is independently chosen from 0 and 1.

In yet another embodiment, at least one low pressure distillation process is conducted to separate at least one liquid crystal group from the liquid mixture, wherein the at least one liquid crystal group comprises at least one liquid crystal compound having two or three hydrocarbon cyclic rings and present in an amount ranging from about 50% to about 100% by weight, relative to the total weight of the at least one liquid crystal group.

In some embodiments, at least one liquid crystal group separated from the liquid mixture has a high $\Delta\epsilon$ value, for example, has a $\Delta\epsilon$ value ranging from 10 to 60.

In some embodiments, at least one liquid crystal group separated from the liquid crystal mixture has a negative $\Delta\epsilon$, for example, has a $\Delta\epsilon$ value ranging from −2 to −20.

In some embodiments, at least one liquid crystal group separated from the liquid mixture has a high viscosity (η), for example, has a viscosity ranging from 30 cps to 150 cps.

In some embodiments, at least one liquid crystal group separated from the liquid mixture has a low viscosity, for example, has a viscosity ranging from 1 cps to 10 cps.

In some embodiments, at least one liquid crystal group separated from the liquid mixture has a high $T_{NI}$, for example, has a $T_{NI}$ ranging from 150° C. to 400° C.

In some embodiments, at least one liquid crystal group separated from the liquid mixture has a Δn ranging from 0.03 to 0.30.

In some embodiments, at least one liquid crystal group separated from the liquid mixture comprises base-fluid type liquid crystal compounds, for example, liquid crystal compounds having three cyclic groups, such as liquid crystal compounds having three cyclic rings, wherein the terminal ring of the liquid crystal compound is a benzene with at least one substituent chosen from halogen group, for example, liquid crystal compounds of formula V:

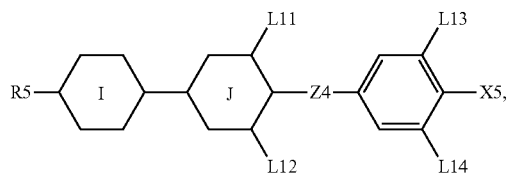

wherein R5 is independently chosen from alkyl having 1 to 12 carbons, alkoxy having 1 to 12 carbons, alkenyl having 2 to 12 carbons; ring I and ring J are each independently chosen from 1,4-cycloheylene and 1,4-phenylene; Z4 is independently chosen from a single bond, ethylene, methyleneoxy, carbonyloxy, and $C_2F_4$; L11, L12, L13 and L14 are each independently chosen from hydrogen and halogen; X5 is independently chosen from hydrogen, halogen, halogenated alkyl, alkenyl, and alkoxy having 1 to 6 carbons.

In one embodiment, at least one liquid crystal group separated from the liquid mixture comprises liquid crystal compounds having three cyclic groups, wherein the terminal ring of the liquid crystal compounds is a benzene with at least one substituent chosen from halogen group and present in an amount ranging from about 50% to about 100% by weight relative to the at least one liquid crystal group.

In some embodiments, the liquid crystal groups separated from the liquid crystal mixture may include:

at least one liquid crystal group having a high Δ∈ ranging from 10 to 50;

at least one liquid crystal group having a viscosity ranging from 1 to 150; and at least one liquid crystal group having a $T_{NI}$ ranging from 150° C. to 400° C.

In some embodiments, the liquid crystal groups separated from the liquid crystal mixture may comprise:

at least one liquid crystal group having a negative-Δ∈ ranging from −2 to −20.

In some embodiments, the liquid crystal groups separated from the liquid crystal mixture may comprise the liquid crystal groups listed in Table 1.

TABLE 1

Positive-type Liquid Crystal Groups

| | Viscosity | | | | Major types of liquid crystal compounds | |
|---|---|---|---|---|---|---|
| Group | (cps) | $T_{NI}$ (° C.) | Δn | Δ∈ | Types | % |
| High Δ∈ | 10~30 | <50 | — | 10~60 | Compounds with at least one $CF_2O$ bridge | 20~100 |
| High viscosity | 30~150 | 150~400 | 0.13~0.3 | <5 | Compounds with at least four cyclic groups | 20~100 |
| Low viscosity | 1~10 | <50 | 0.03~0.08 | <5 | Compounds with two or three hydrocarbon cyclic rings | 50~100 |
| Base-fluid | 10~30 | 50~80 | 0.08~0.12 | 0~10 | Compounds having three cyclic rings and wherein the terminal ring of the compounds is a benzene ring with at least one substituent chosen from halogen group | 50~100 |

In some embodiments, the liquid crystal groups separated from the liquid crystal mixture may comprise the liquid crystals groups listed in Table 2.

TABLE 2

VA-type Liquid Crystal Groups

| | Viscosity | | | | Major types of liquid crystal compounds | |
|---|---|---|---|---|---|---|
| Group | (cps) | $T_{NI}$ (° C.) | Δn | Δ∈ | Types | % |
| Low viscosity | 1~15 | <60 | 0.03~0.08 | <5 | Compounds with two or three hydrocarbon cyclic rings | 50~100 |

TABLE 2-continued

VA-type Liquid Crystal Groups

| Group | Viscosity (cps) | $T_{NI}$ (° C.) | $\Delta n$ | $\Delta \epsilon$ | Major types of liquid crystal compounds Types | % |
|---|---|---|---|---|---|---|
| Negative $\Delta \epsilon$ | 20~40 | 80~100 | 0.13~0.3 | −2~−20 | Compounds with at least two lateral halogen | 50~100 |
| Base-fluid | 10~30 | 50~80 | 0.08~0.12 | −1~5 | Compounds having three cyclic rings and wherein the terminal ring of the compounds is a benzene ring with at least one substituent chosen from halogen group | 50~100 |

C. Measurements of Physical Properties

Before reformulation, the liquid crystal mixture or the liquid crystal groups separated from the liquid crystal mixture may be subject to various measurements, such as at step 110 of FIG. 1, to determine their physical properties such as to determine their $\Delta \epsilon$, $\Delta n$, and $T_{NI}$ values. A Liquid Crystal Database may be optionally established to record the physical properties of the liquid crystal mixtures or the liquid crystal groups separated from the liquid crystal mixture(s).

D. Reformulating Liquid Crystal Mixture

Either the liquid crystal mixture or the liquid crystal groups separated from the liquid crystal mixture may be used to form a reformulated liquid crystal mixture, such as step 114. In some embodiments, the step of forming a reformulated liquid crystal mixture comprises using at least one liquid crystal group separated from the liquid crystal mixture, for example, using at least one of the first, the second, the third, the forth, the fifth liquid crystal group separated from the liquid crystal mixture. For example, in one embodiment, the step of forming a reformulated liquid crystal mixture comprises using the first and the second liquid crystal groups separated from the liquid crystal mixture.

In some embodiments, the step of forming a reformulated liquid crystal mixture comprises using liquid crystal groups separated from different liquid crystal mixtures, for example, using at least one liquid crystal group separated from a first liquid crystal mixture; and at least one other liquid crystal group separated from a second liquid crystal mixture.

In some embodiments, the step of forming a reformulated liquid crystal mixture comprises using at least one liquid crystal group separated from a first liquid crystal mixture and a second liquid crystal mixture without separation.

In some embodiments, the step of forming a reformulated liquid crystal mixture comprises using at least one liquid crystal mixture without separation and a second liquid crystal mixture without separation.

In some embodiments, at least one mapping process is conducted before forming the reformulated liquid crystal mixture. The at least one mapping process may include one or more of the following steps:
(1) determining the desired physical properties of a target liquid crystal mixture, such as determining the desired values of $\Delta \epsilon_{(target)}$, $\Delta n_{(target)}$, and $T_{NI\ (target)}$;
(2) selecting the liquid crystal group(s) and/or liquid crystal mixture(s) for forming the reformulated liquid crystal mixture;
(3) determining the amount or the weight ratios of the liquid crystal group(s) and/or liquid crystal mixture to be combined for forming the reformulated liquid crystal mixture; and
(4) combining the liquid crystal group(s) and/or liquid crystal mixture(s).

Methods for determining the amount or the weight ratios of the liquid crystal group(s) and/or liquid crystal mixture for forming the reformulated liquid crystal mixture are known in the art. In some embodiments, the amount of the liquid crystal group(s) and/or liquid crystal mixture can be determined or computed based on the desired properties and the properties of the liquid crystal groups used. In some other embodiments, the amount of the liquid crystal group(s) and/or liquid crystal mixtures can be computed by using linear, non-linear, or other equations, which may be developed based on the known characteristics, based on database, or based on experience accumulated after mixing similar or different groups or compounds. As a non-limiting example, if Liquid Crystal Group A having $Viscosity_{(A)}$, $\Delta \epsilon_{(A)}$, and $\Delta n_{(A)}$, Liquid Crystal Group B having $Viscosity_{(B)}$, $\Delta \epsilon_{(B)}$, and $\Delta n_{(B)}$, Liquid Crystal Group C having $Viscosity_{(C)}$, $\Delta \epsilon_{(C)}$, and $\Delta n_{(C)}$ are selected for forming a reformulated liquid crystal mixture having a $Viscosity_{(target)}$, $\Delta \epsilon_{(target)}$, and $\Delta n_{(target)}$, the weight ratios of Liquid Crystal Group A (weight ratio X), Liquid Crystal Group B (weigh ratio Y), and Liquid Crystal Group C (weight ratio Z) can be computed using the following linear equations:

$$X^*(Viscosity_{(A)}) + Y^*(Viscosity_{(B)}) + Z^*(Viscosity_{(c)}) = (X+Y+Z)^*Viscosity_{(target)}$$

$$X^*(\Delta \epsilon_{(A)}) + Y^*(\Delta \epsilon_{(B)}) + Z^*(\Delta \epsilon_{(C)}) = (X+Y+Z)^*\Delta \epsilon_{(target)}$$

$$X^*(\Delta n_{(A)}) + Y^*(\Delta n_{(B)}) + Z^*(\Delta n_{(C)}) = (X+Y+Z)^*\Delta n_{(target)}$$

Note that it is possible that the combination of the computed amount of liquid crystal groups might result a liquid crystal mixture with physical properties slightly deviated from the desired physical properties. If the deviation is relatively small, one may choose to slightly modify the weight ratio among the selected liquid crystal groups. If the deviation is substantial, one may introduce additional liquid crystal group(s) or liquid crystal compounds in an amount sufficient to obtain a reformulated liquid crystal mixture with the desired properties or substitute one or more of the selected liquid crystal groups with different liquid crystal groups.

The reformulated liquid crystal mixtures prepared according to the present disclosure may have at least one parameter chosen from $\Delta \epsilon$, viscosity, $T_{NI}$, and $\Delta n$ similar to that of a commercially available liquid crystal mixture. In some embodiments, the $\Delta \epsilon$, viscosity, $T_{NI}$, and $\Delta n$ of the reformulated liquid crystal mixture are about the same as those of a commercially available liquid crystal mixture. In some embodiments, the voltage dependant transmittance curve (herein referred to as "V-T curve") of the reformulated liquid crystal mixture may be substantially similar to the V-T curve of commercially available liquid crystal mixture.

In some embodiments, the reformulated liquid crystal mixture comprises at least one characteristic chosen from: a viscosity ranging from about 2 cps to about 100 cps, a $T_{NI}$ ranging from about 70° C. to about 120° C., a Δn ranging from about 0.06 to about 0.25, and a Δ∈ ranging from about 1 to about 50. In some embodiments, the reformulated liquid crystal mixture has a Δ∈ ranging from about −1 to about −10.

In some embodiments, the reformulated liquid crystal mixture comprises at least twenty-five liquid crystal compounds.

In some embodiments, the reformulated liquid crystal mixture will not form any crystals at a temperature of about −50° C. in about 120 hours. This is in contrast to certain liquid crystal mixtures currently available on the market, which will form crystals at about −40° C. in about 120 hours; thus, the reformulated liquid crystal may have a broader working temperature range. In one embodiment, the reformulated liquid crystal mixture that will not form any crystals at a temperature of about −50° C. in about 120 hours has a $T_{NI}$ of about 80° C.

E. Reuse

Before reusing, such as step 118 illustrated in FIG. 1, the reformulated liquid crystal may subject to at least one purification process to remove impurities such as metal ions (step 116).

In some embodiments, the reformulated liquid crystal is used for the production of LCD device, such as notebook computers, desktop monitors, electronic organizers, mobile phones, pocket calculators, measuring instruments, electronic toys, digital cameras, audio-video equipment, household appliances and automotive displays.

The liquid crystal compounds which may be recycled or reused according to the present disclosure include any of the liquid crystal compounds known to those skilled in the art.

Example 1

Figure 2:
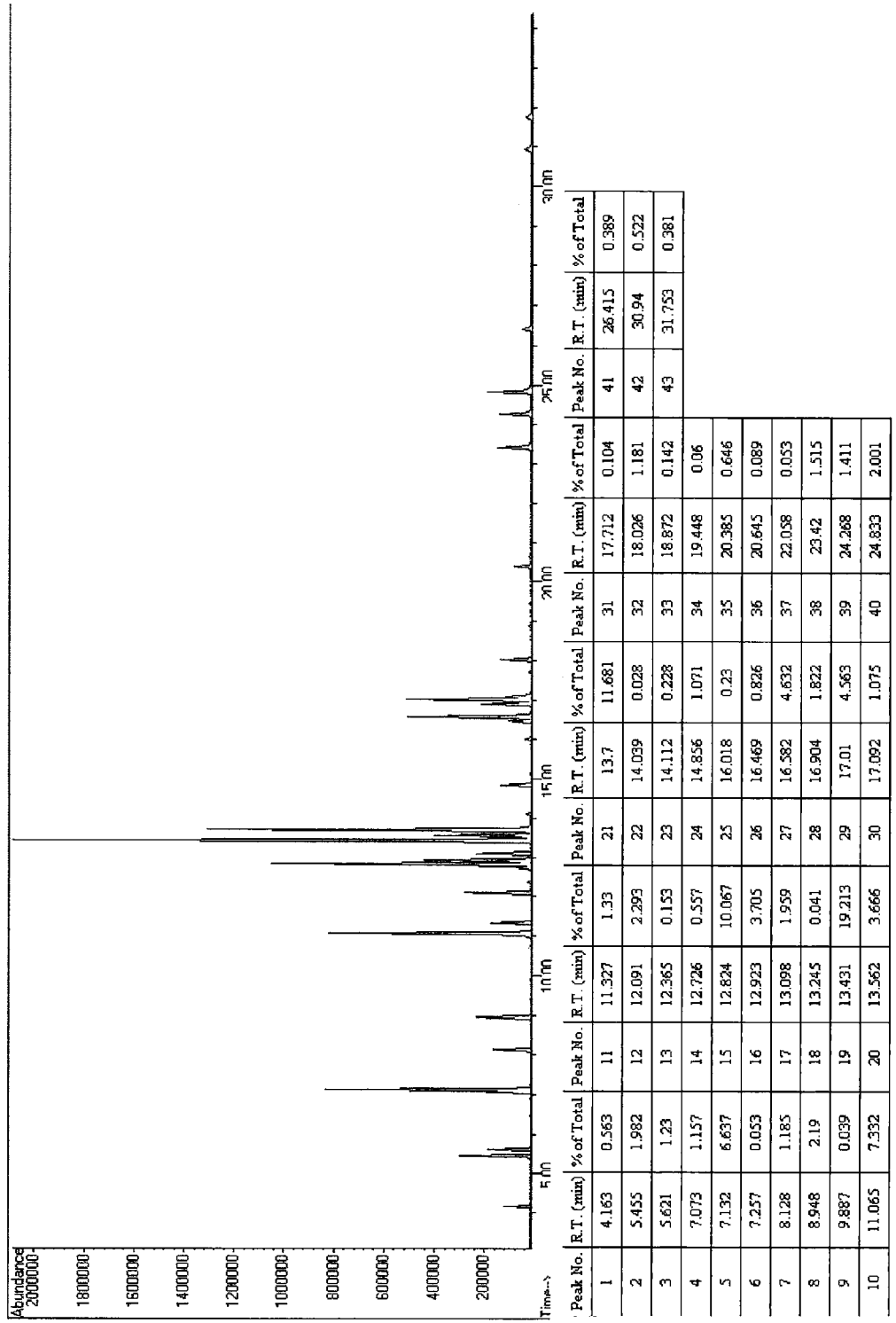
FIG. 2 illustrates the gas chromatography-mass spectrum (GC/MS) of LC1 consistent with the disclosed embodiments.
Figure 3:
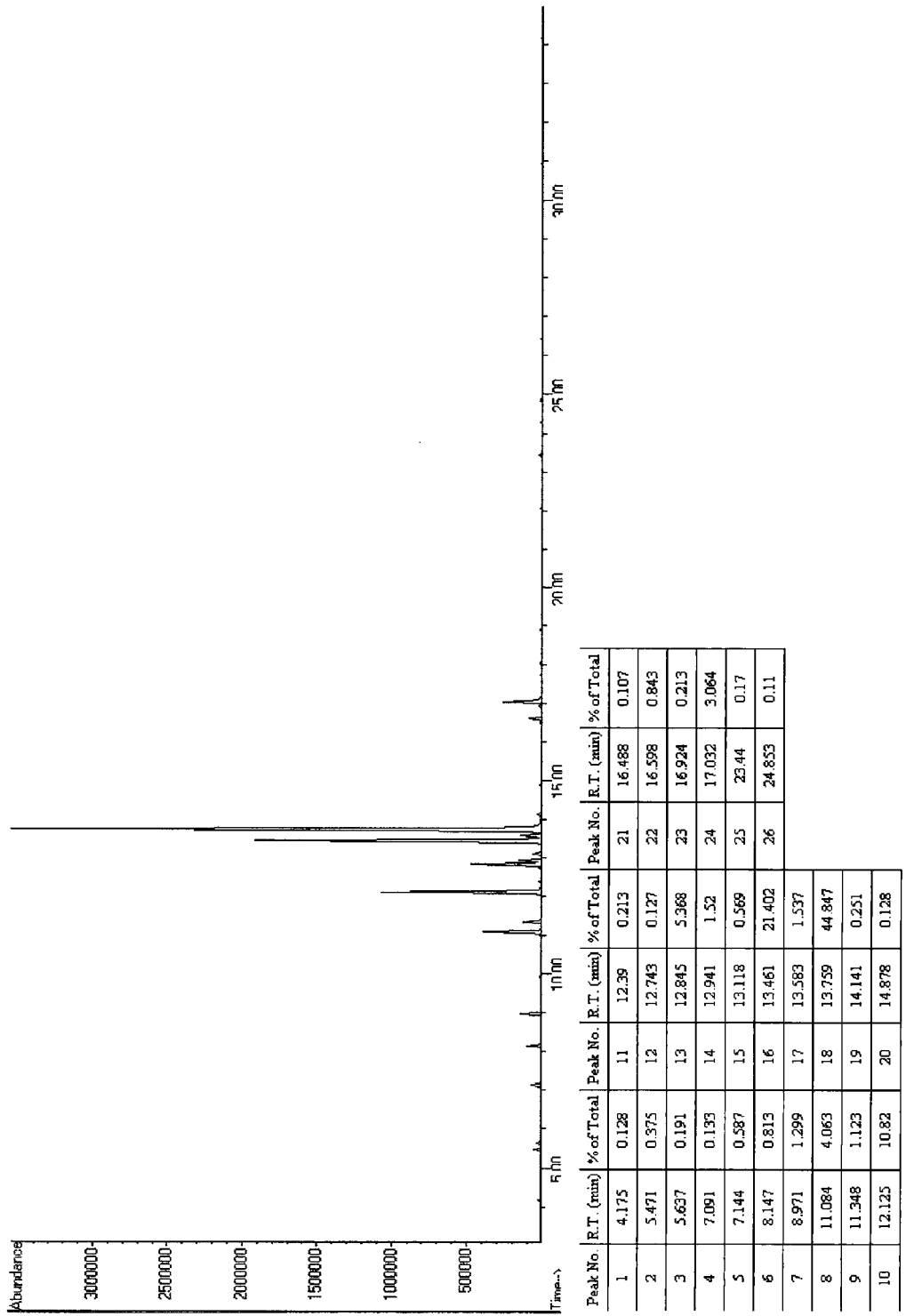
FIG. 3 illustrates the GC/MS of High-$\Delta\in$ liquid crystal group consistent with the disclosed embodiments.
Figure 4:
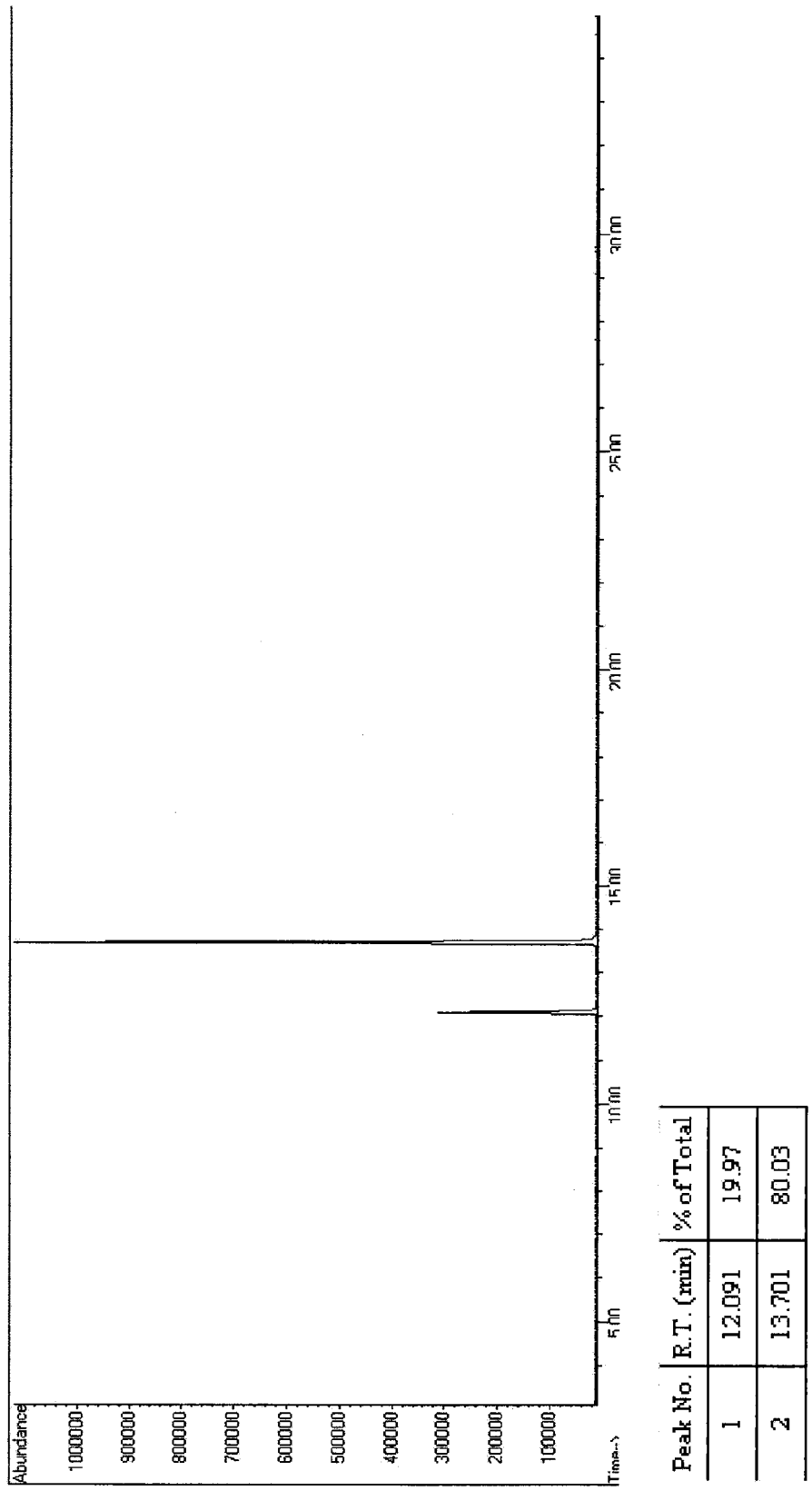
FIG. 4 illustrates the GC/MS of $CF_2O$ liquid crystal group consistent with the disclosed embodiments.
Figure 5:
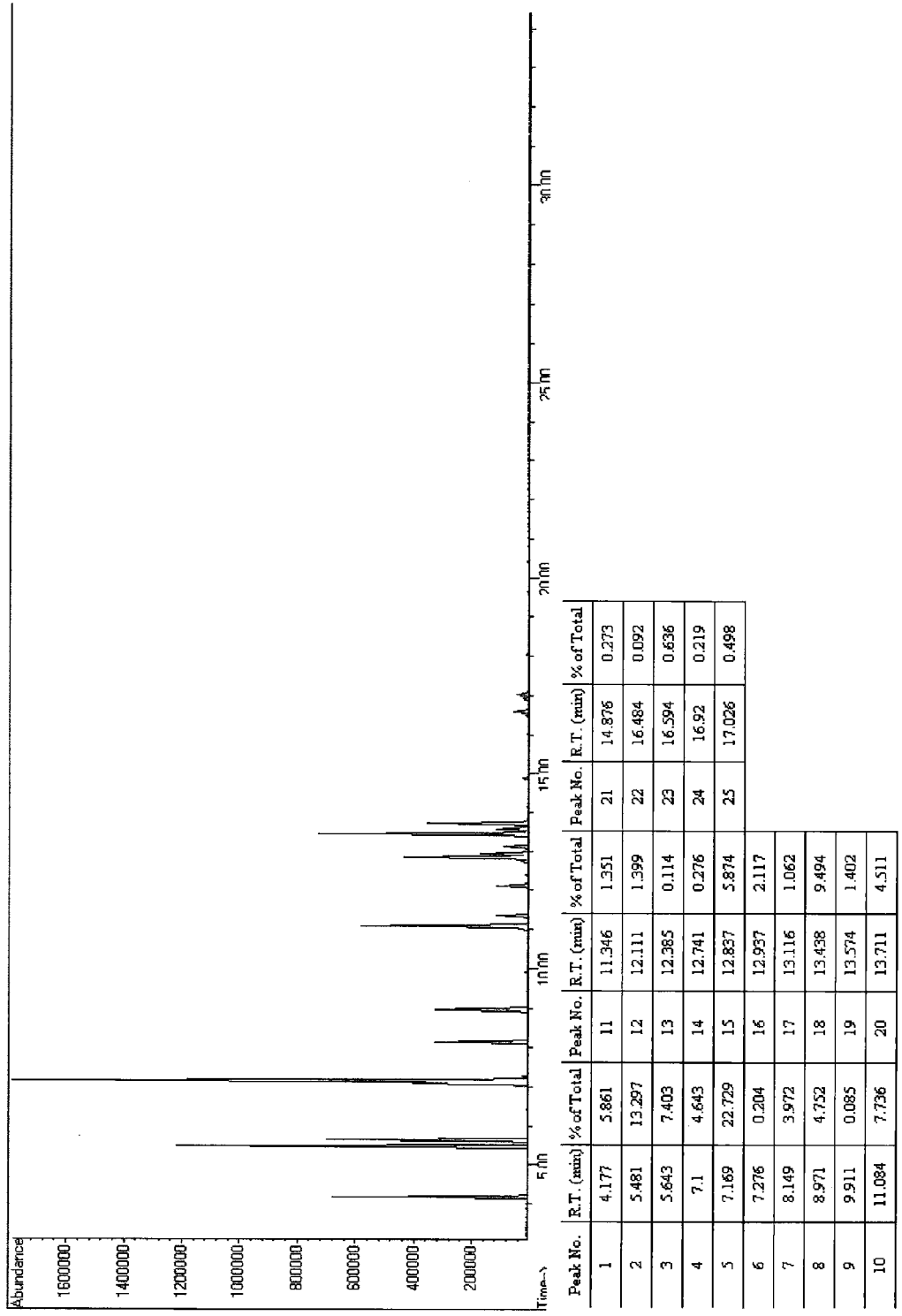
FIG. 5 illustrates the GC/MS of Low-viscosity liquid crystal group consistent with the disclosed embodiments.
Figure 6:
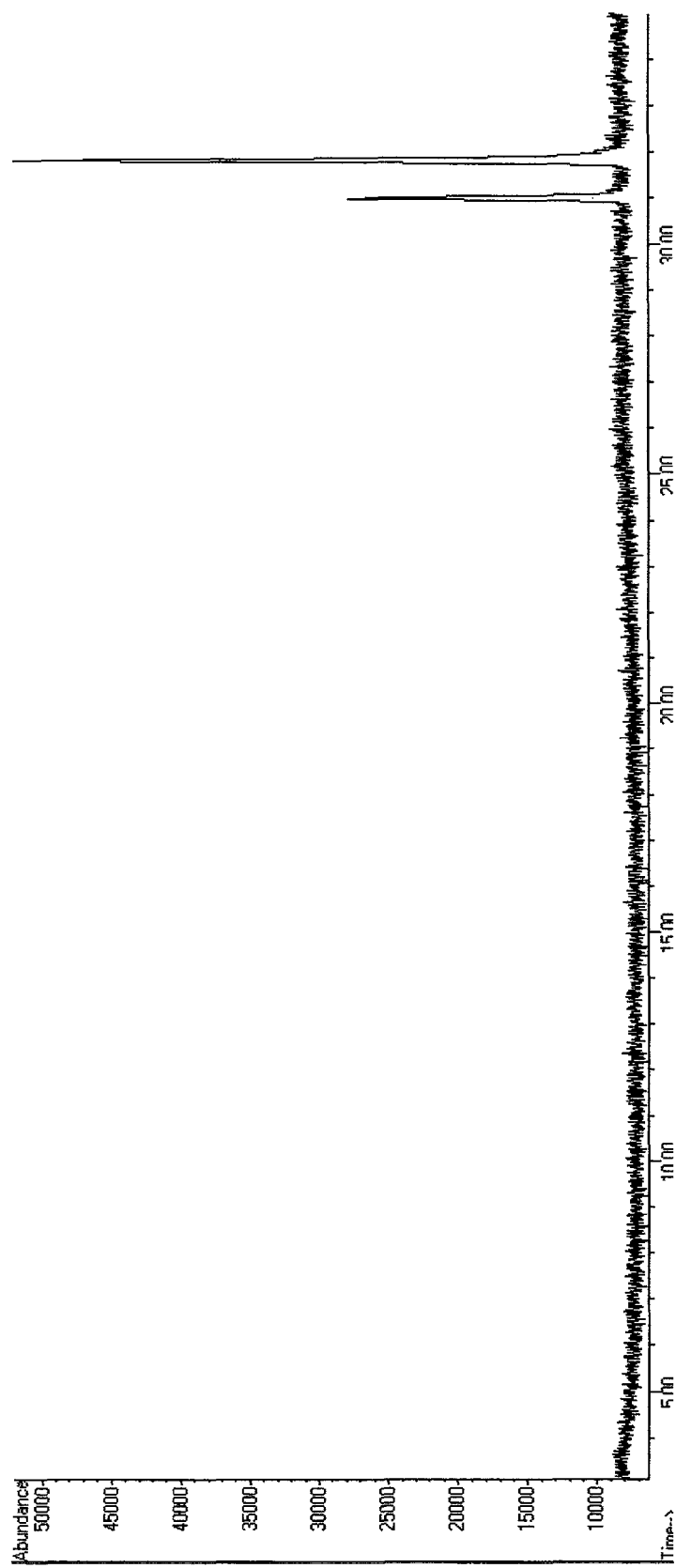
FIG. 6 illustrates the GC/MS of High-$T_{NI}$ liquid crystal group consistent with the disclosed embodiments.
Figure 7:
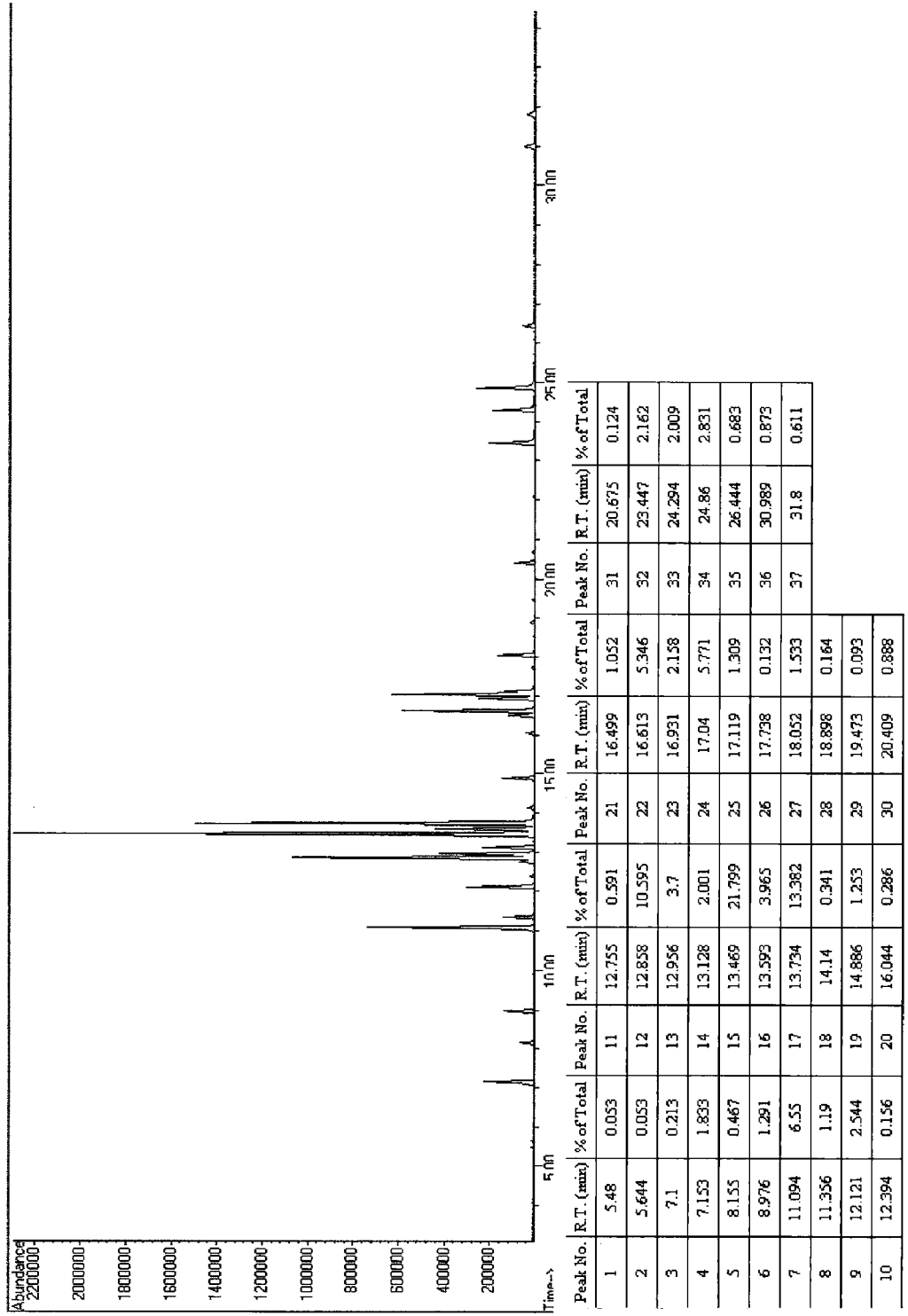
FIG. 7 illustrates the GC/MS of Base-fluid liquid crystal group consistent with the disclosed embodiments.

In one example, a Positive-type liquid crystal mixture may be obtained by retrieving liquid crystals from 500 waste liquid crystal panels (five different models of the PositiveTN-type liquid crystal panel, one hundred panels per each model). After crushing the liquid crystal panels, continuous extraction may be used to extract liquid crystals from the crushed panels and to further remove the impurities from the retrieved liquid crystals. About 200 grams of liquid crystal mixture ("LC-1 mixture") containing five formulations of liquid crystal mixtures may be obtained. FIG. 2 illustrates the gas chromatography-mass spectrum (GC/MS) of the LC-1 mixture. Next, 200 g of acetonitrile may be used to extract 200 g of the LC-1 mixtures four times, resulting about 36.1 g of a High-Δ∈ group liquid crystal group ("High-Δ∈ group") having a Δ∈ of about 14.3. FIG. 3 illustrates the GC/MS spectrum of the High-Δ∈ group. The remaining 163 g of the liquid crystal mixture may be then extracted with column chromatography using silicon base (e.g., SiO₂) as the stationary phase and acetonitrile as the mobile phase. After the extraction, about 18.9 g of a High-$T_{NI}$ liquid crystal group ("High-$T_{NI}$ group") having a $T_{NI}$ of 360° C. may be obtained. FIG. 6 illustrates the GC/MS spectrum of the High-$T_{NI}$ group. The remaining 143 g of liquid crystal mixture may be then further separated by low-pressure distillation for 18 hours at 160° C. and a pressure of 6 torr, which led to about 40.1 g of a Low-viscosity liquid crystal group ("Low-viscosity group") having a viscosity (η) of about 2.8 cps. FIG. 5 illustrates the GC/MS of the Low-viscosity group. The remaining 101 g of the liquid crystal mixture may be the Base-fluid group liquid crystals ("Base-fluid group"). FIG. 7 illustrates the GC/MS spectrum of the Base-fluid group. The physical properties of each group are summarized in Table 3. Finally, the High-Δ∈ group may be further separated by a column chromatography using carbon base (e.g., C8 and C18) as the stationary phase and hexane as the mobile phase. In doing so, a liquid crystal group comprising more than 90% of liquid crystal compounds with at least one CF₂O bridge and a Δ∈ of about 25 ("High-CF₂O group") may be further separated. FIG. 4 illustrates the GC/MS spectrum of the High-CF₂O group.

TABLE 3

Physical Properties of the LC-1 mixture and the various liquid crystal groups separated from the LC-1 mixture.

| | | Groups | | | |
|---|---|---|---|---|---|
| Parameters | LC-1 | Low-Viscosity | High-Δ∈ | High-$T_{NI}$ | Base-fluid |
| The number of liquid crystal compounds in the mixture/groups | 43 | 25 | 26 | 2 | 37 |
| η (cps) | 20 | 4.0 | 20 | 55 | 23 |
| Tni (° C.) | 91.8 | 56.8 | 20.8 | 360 | 63.5 |
| Δn | 0.103 | 0.068 | 0.104 | 0.21 | 0.105 |
| Δ∈ | 8.4 | 2.5 | 14.3 | 2.8 | 4.5 |

Example 2

Figure 8:
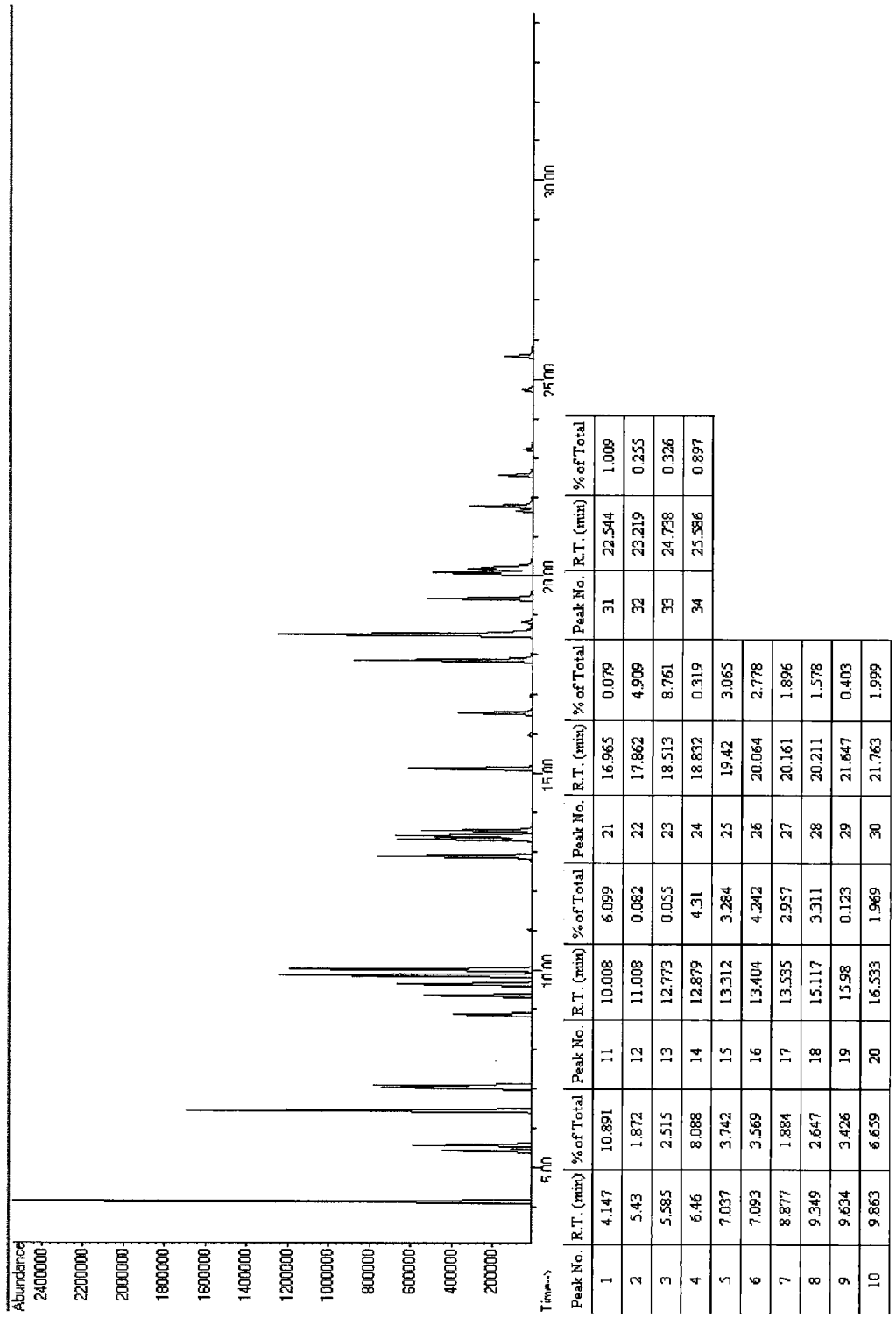
FIG. 8 illustrates the GC/MS of LC-2 consistent with the disclosed embodiments.
Figure 9:
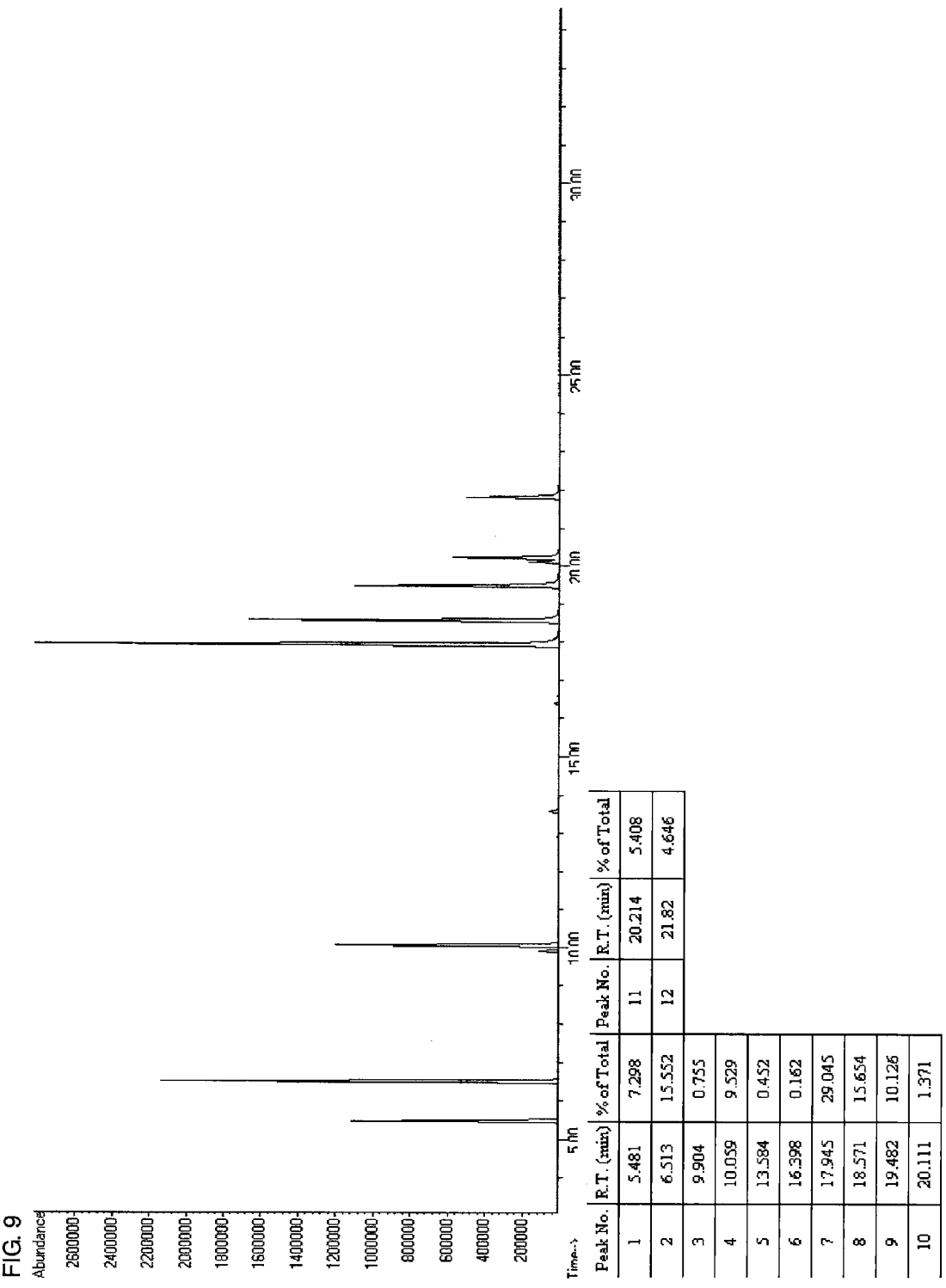
FIG. 9 illustrates the GC/MS of Negative-$\Delta\in$ liquid crystal group consistent with the disclosed embodiments.

In another example, a VA-type liquid crystal mixture may be obtained by retrieving liquid crystals from 100 waste liquid crystal panels (four different models of the VA-type liquid crystal panel, twenty-five panels per each model). Specifically, after crushing the liquid crystal panels, continuous extraction may be used to extract liquid crystal from the crushed panels and to further remove the impurities from the retrieved liquid crystals. 120 grams of liquid crystal mixture ("LC-2 mixture") containing four formulations of liquid crystal compounds may be obtained. FIG. 8 illustrates the GC/MS spectrum of the LC-2 mixture. 120 g of LC-2 mixture may be then separated by column chromatography using SiO₂ as the stationary phase and hexane as the mobile phase, which yielded 42.1 g of a Negative-Δ∈ liquid crystal group ("Negative-Δ∈ group") having a Δ∈ of −4. FIG. 9 illustrates the GC/MS spectrum of the Negative-Δ∈ group. The remaining 77.5 g of liquid crystals may be then further processed by low pressure distillation for 18 hours at 160° C. and under a pressure of 6 torr, resulting about 15.6 g of a Low-viscosity liquid crystal group ("Low-viscosity group") having a viscosity (η) of about 4.5 cps. The remaining 62.0 g of liquid crystals may be the Base-fluid liquid crystal group ("Base-fluid"). The physical properties of each liquid crystal groups separated from the LC-2 mixture are summarized in Table 4.

TABLE 4

Physical Properties of the LC-2 mixture and various groups isolated from the LC-2 mixture.

| | | Groups | | |
|---|---|---|---|---|
| Parameters | LC-2 | Low-viscosity | Negative-Δ∈ | Base-fluid |
| The number of liquid crystal | 34 | 18 | 12 | 28 |

TABLE 4-continued

Physical Properties of the LC-2 mixture and various groups isolated from the LC-2 mixture.

| | | Groups | | |
|---|---|---|---|---|
| Parameters | LC-2 | Low-viscosity | Negative-$\Delta\epsilon$ | Base-fluid |
| compounds in the mixture/groups | | | | |
| $\eta$ (cps) | 22 | 4.3 | 28 | 25 |
| $T_{NI}$ (° C.) | 85 | 50.5 | 84.7 | 86.5 |
| $\Delta n$ | 0.098 | 0.041 | 0.111 | 0.088 |
| $\Delta\epsilon$ | −2.5 | −1.5 | −4.0 | −2.2 |

Example 3

In another example, the physical properties of a commercial TN-type liquid crystal mixture ("LC-3"), shown in Table 5, may be set as the targeted physical properties, and the various liquid crystal groups obtained in Example 1 may be used to prepare a reformulated liquid crystal mixture ("LC-4").

Upon calculations, Base-fluid group, Low-viscosity group, High-$\Delta\epsilon$ group, and High-$T_{NI}$ group obtained in Example 1 may be mixed at weight percentages of about 18%, 43%, 28%, and 11%, in the order presented, to form LC-4.

Figure 10:
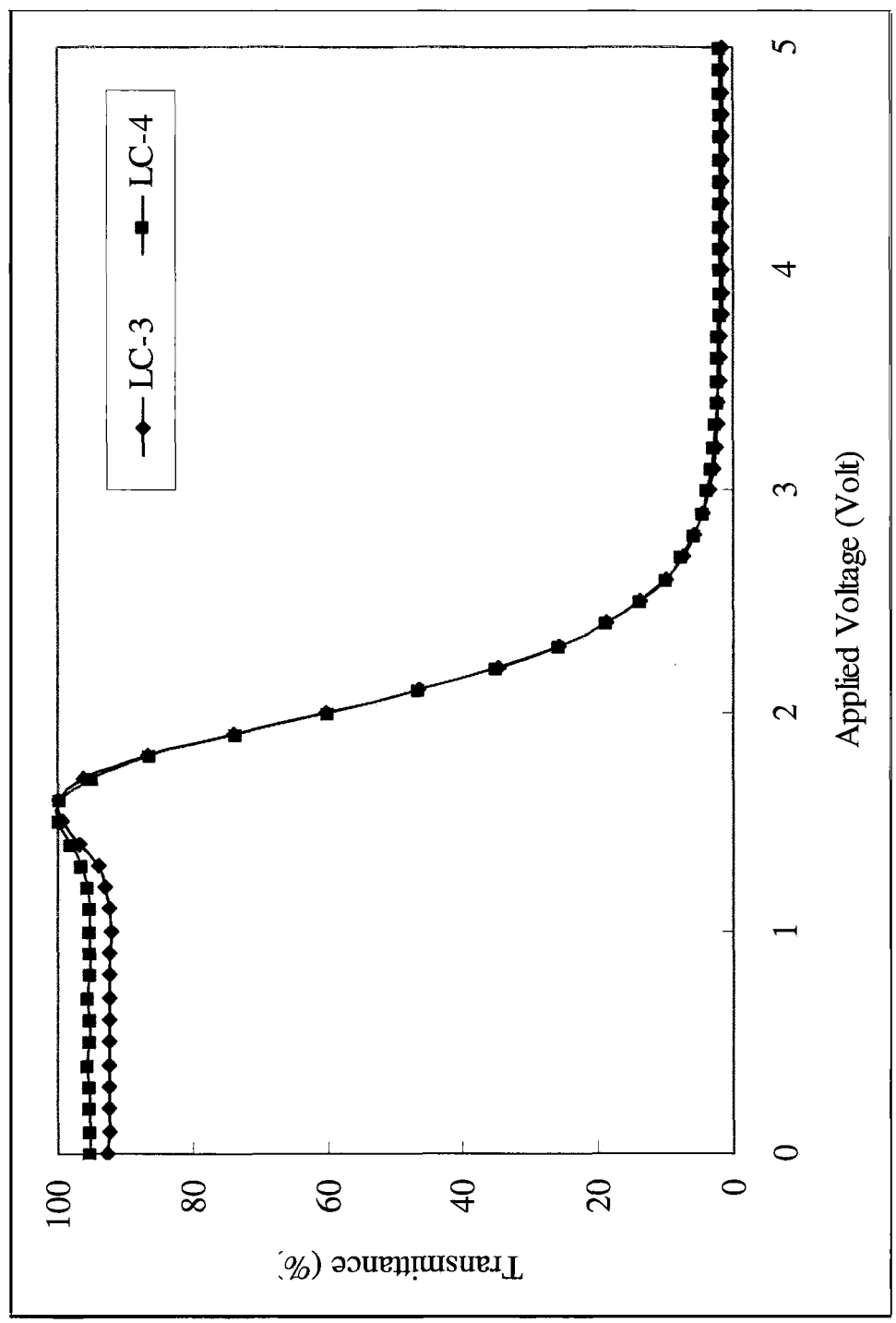
FIG. 10 illustrates the V-T curves of LC-3 and LC-4 consistent with the disclosed embodiments.
Figure 11:
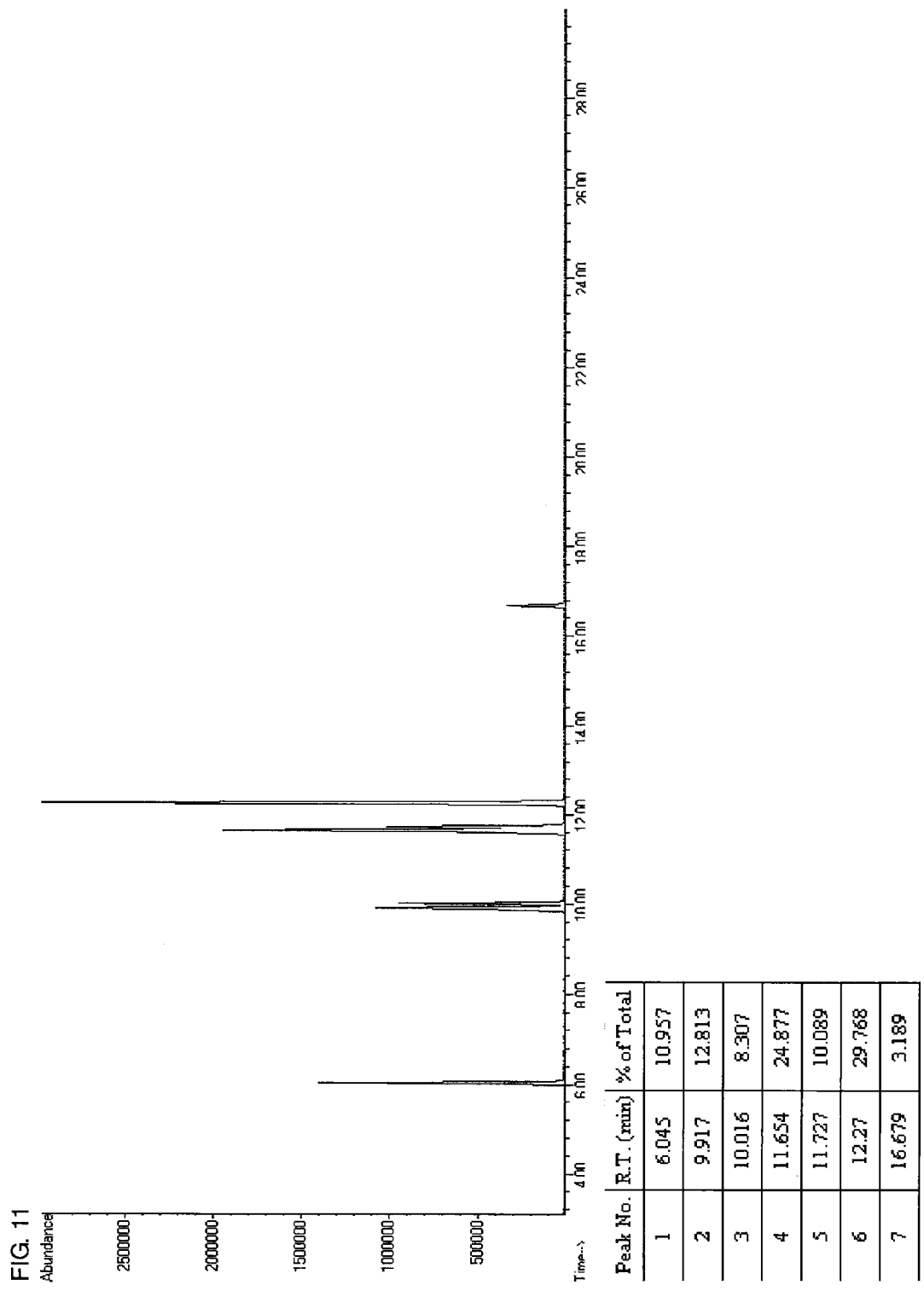
FIG. 11 illustrates the GC/MS of LC-3 consistent with the disclosed embodiments.
Figure 12:
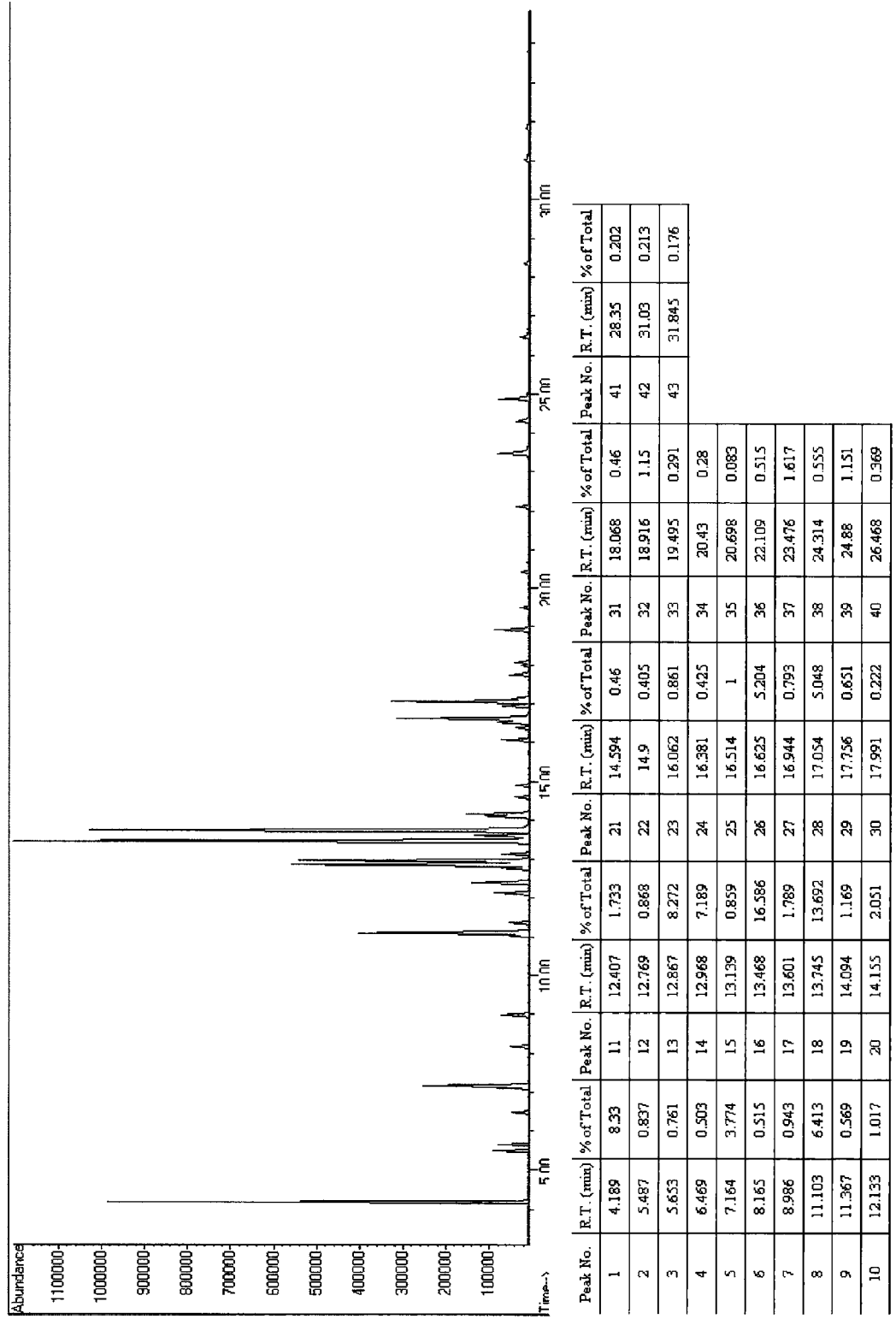
FIG. 12 illustrates the GC/MS of LC-4 consistent with the disclosed embodiments.

FIG. 11 and FIG. 12 illustrate the GC/MS spectrum of LC-3 and LC-4, respectively. A side-by-side comparison of the physical properties of LC-3 and LC-4 is shown in Table 5, and the V-T curves of LC-3 and LC-4 are shown in FIG. 10. Table 5 and FIG. 9 show that, while LC-4 contained 43 liquid crystal compounds, as opposed to only 7 liquid crystal compounds contained in LC-3, both the physical properties and the V-T curve of LC-4 may be substantially similar to that of LC-3. Thus, LC-4, prepared directly from the liquid crystals retrieved from waste liquid crystal panels, can be used as an alternative to LC-3 for the preparation of LCD panels.

TABLE 5

Physical properties of LC-3 and LC-4.

| Parameter/standard error | LC-3 | LC-4 |
|---|---|---|
| $\eta$ (cps)/±1 | 17 | 17 |
| $T_{NI}$ (° C.)/±1 | 80.5 | 81.2 |
| $\Delta n$/±0.001 | 0.098 | 0.099 |
| $\Delta\epsilon$/±0.3 | 6.3 | 6.2 |
| V10-V50-V90 (Volt) | 2.57-2.07-1.76 | 2.60-2.07-1.76 |
| Response time (ms) | 13.9 | 13.9 |
| VHR (%) | 83.5 | 85.2 |

Example 4

In still another example, the physical properties of a commercial VA-type liquid crystal mixture ("LC-5"), shown in Table 6, may be set as the targeted physical properties, and the various liquid crystal groups obtained in Example 2 may be used to prepare a reformulated liquid crystal mixture ("LC-6").

Upon calculations, Base-fluid group, Low-viscosity group, and Negative-$\Delta\epsilon$ group obtained in Example 2 may be mixed at weight percentages of about 23%, 32%, and 45%, in the order presented, to form LC-6.

Figure 13:
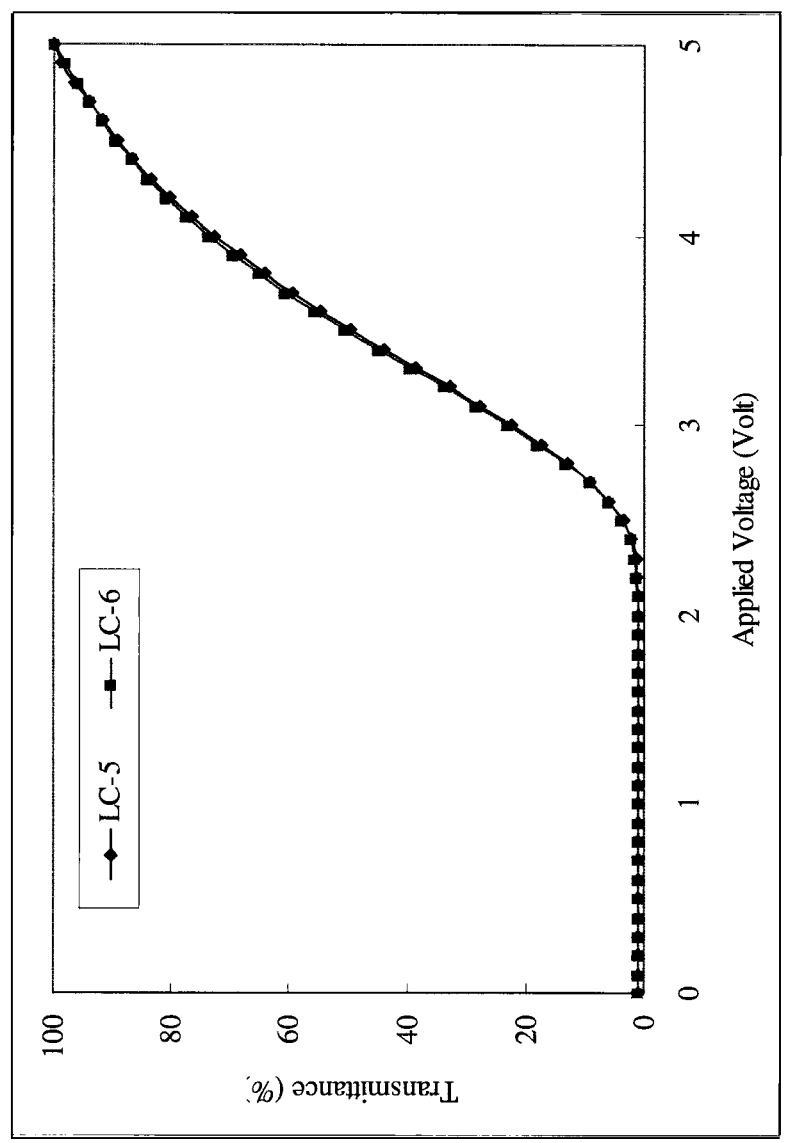
FIG. 13 illustrates the V-T curves of LC-5 and LC-6 consistent with the disclosed embodiments.
Figure 14:
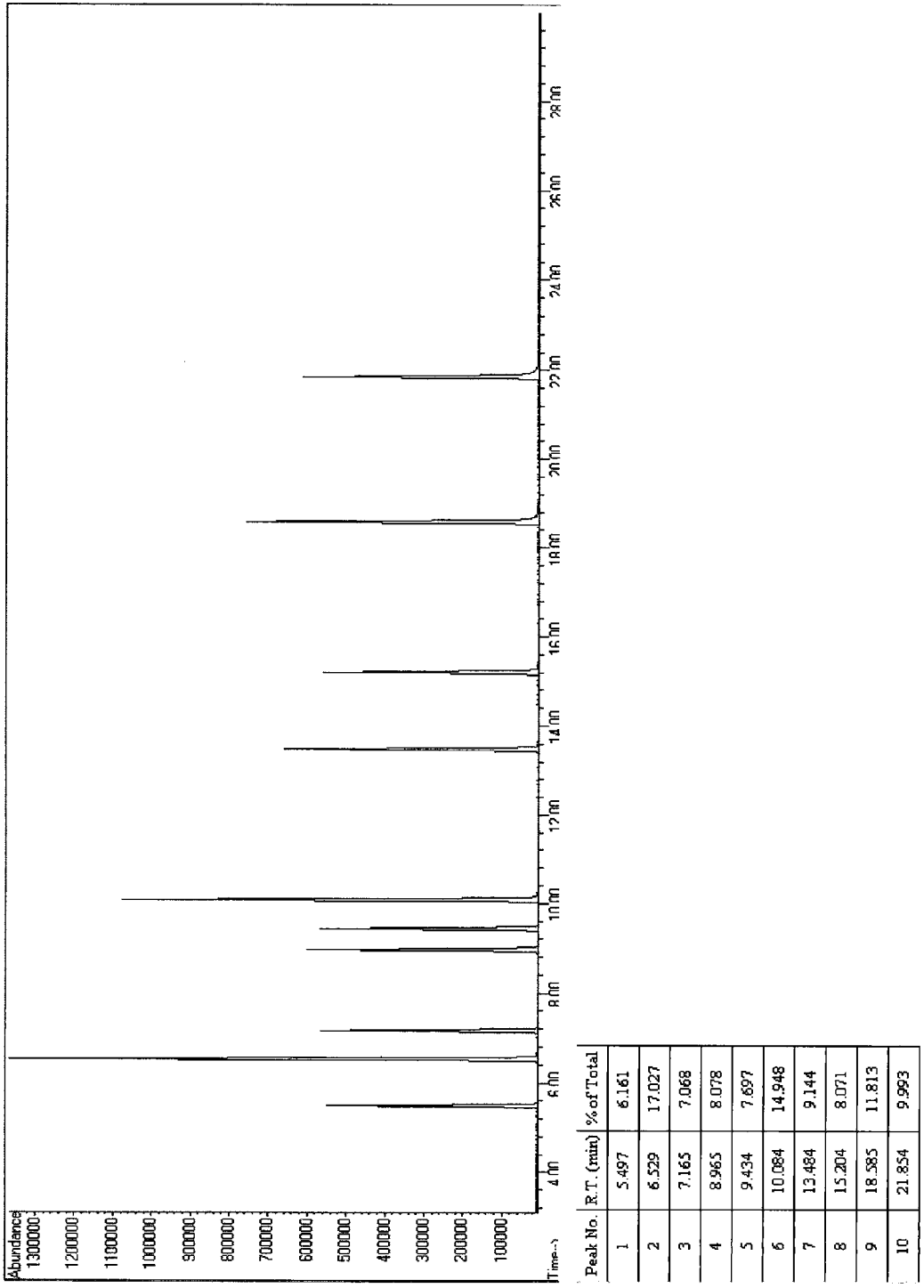
FIG. 14 illustrates the GC/MS of LC-5 consistent with the disclosed embodiments.
Figure 15:
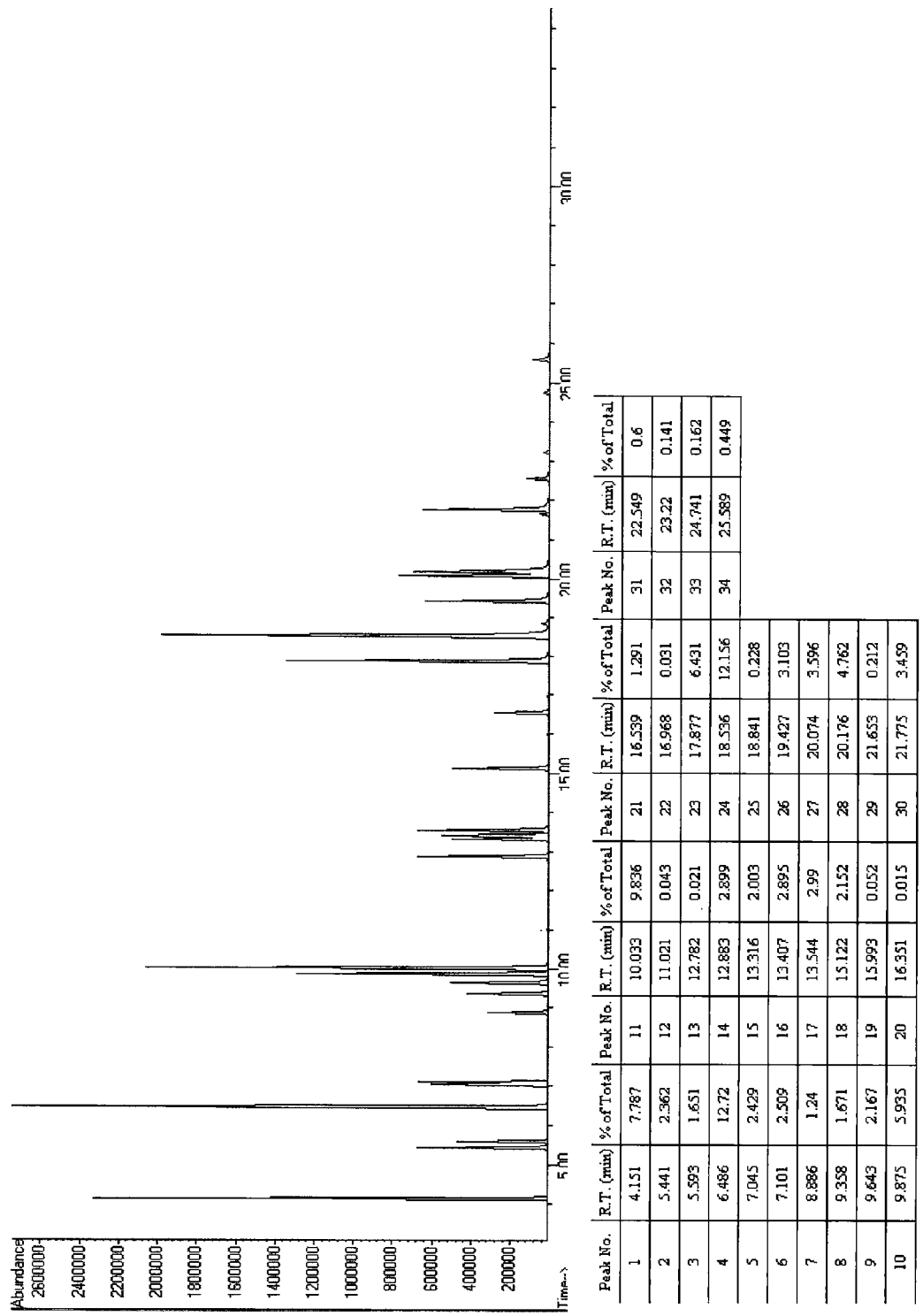
FIG. 15 illustrates the GC/MS of LC-6 consistent with the disclosed embodiments.

FIG. 14 and FIG. 15 illustrate the GC/MS spectrum of LC-5 and LC-6, respectively. A side-by-side comparison of the physical properties of LC-5 and LC-6 is shown in Table 6, and the V-T curves of LC-5 and LC-6 are shown in FIG. 13. Table 6 and FIG. 13 show that, while LC-6 contained 34 different types of liquid crystal compounds, as opposed to only 10 different types of liquid crystal compounds in LC-5, both the physical properties and the V-T curve of LC-6 may be similar to those of LC-5. Thus, LC-6, prepared directly from the liquid crystals retrieved from waste liquid crystal panels, can be used as an alternative to LC-5 for the preparation of LCD panels.

TABLE 6

Physical properties of LC-5 and LC-6.

| Parameter/Standard error | LC-5 | LC-6 |
|---|---|---|
| $\eta$(cps)/±1 | 19 | 19 |
| $T_{NI}$ (° C.)/±1 | 74 | 74.2 |
| $\Delta n$/±0.001 | 0.082 | 0.083 |
| $\Delta\epsilon$/±0.3 | −3 | −2.8 |
| V10-V50-V90 (Volt) | 2.73-3.51-4.53 | 2.72-3.49-4.52 |
| Response time (ms) | 16.7 | 17.2 |
| VHR (%) | 98.5 | 98.5 |

Example 5

To compare the working temperature range of the reformulated liquid crystal mixtures to that of commercially available liquid crystal mixtures, LC-3, LC-4, LC-5, and LC-6 as described above were placed at −20° C., −30° C., −40° C., or −50° C. for 120 hours. The results shown in Table 7 indicates that the reformulated liquid crystal mixture LC-4 had a broader working temperature range (i.e., from about −50° C. to about 81.2° C.) than the commercially available liquid crystal mixture LC-3 (i.e., from about −30° C. to about 80.5° C.).

TABLE 7

| Temperature/duration | LC-3 | LC-4 | LC-5 | LC-6 |
|---|---|---|---|---|
| −20° C./120 hours | No crystallization | No crystallization | No crystallization | No crystallization |
| −30° C./120 hours | No crystallization | No crystallization | No crystallization | No crystallization |
| −40° C./120 hours | crystallization | No crystallization | No crystallization | No crystallization |
| −50° C./120 hours | crystallization | No crystallization | crystallization | No crystallization |

Example 6

Figure 16:
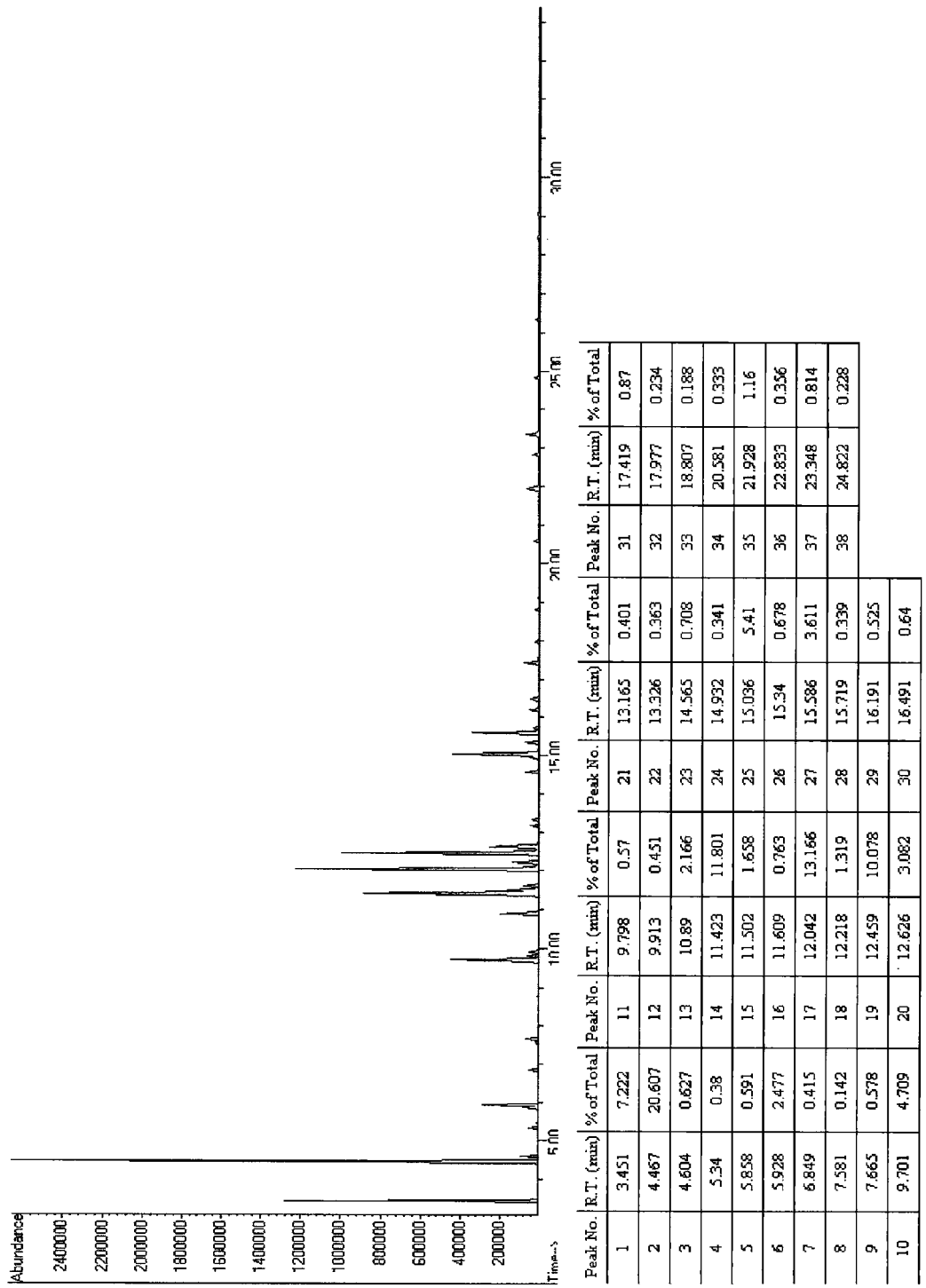
FIG. 16 illustrates the GC/MS of LC-7 consistent with the disclosed embodiments.

A liquid crystal mixture may be retrieved from 1000 pieces of waste liquid crystal display panels (containing four different models of TN-type liquid crystal display, 250 pieces for each model). After separation and reformulation according to the present disclosure, a reformulated liquid crystal mixture, LC-7, is obtained. The physical properties of LC-7 are shown in Table 8, and the GC/MS spectrum of LC-7 is shown in FIG. 16.

TABLE 8

Physical properties of LC-7.

| Physical Properties | LC-7 |
|---|---|
| The number of liquid crystal compounds in the mixture | 38 |
| η (cps) | 12 |
| $T_{NI}$ (° C.) | 76.2 |
| Δn | 0.101 |
| Δε | 6.0 |

Example 7

Figure 17:
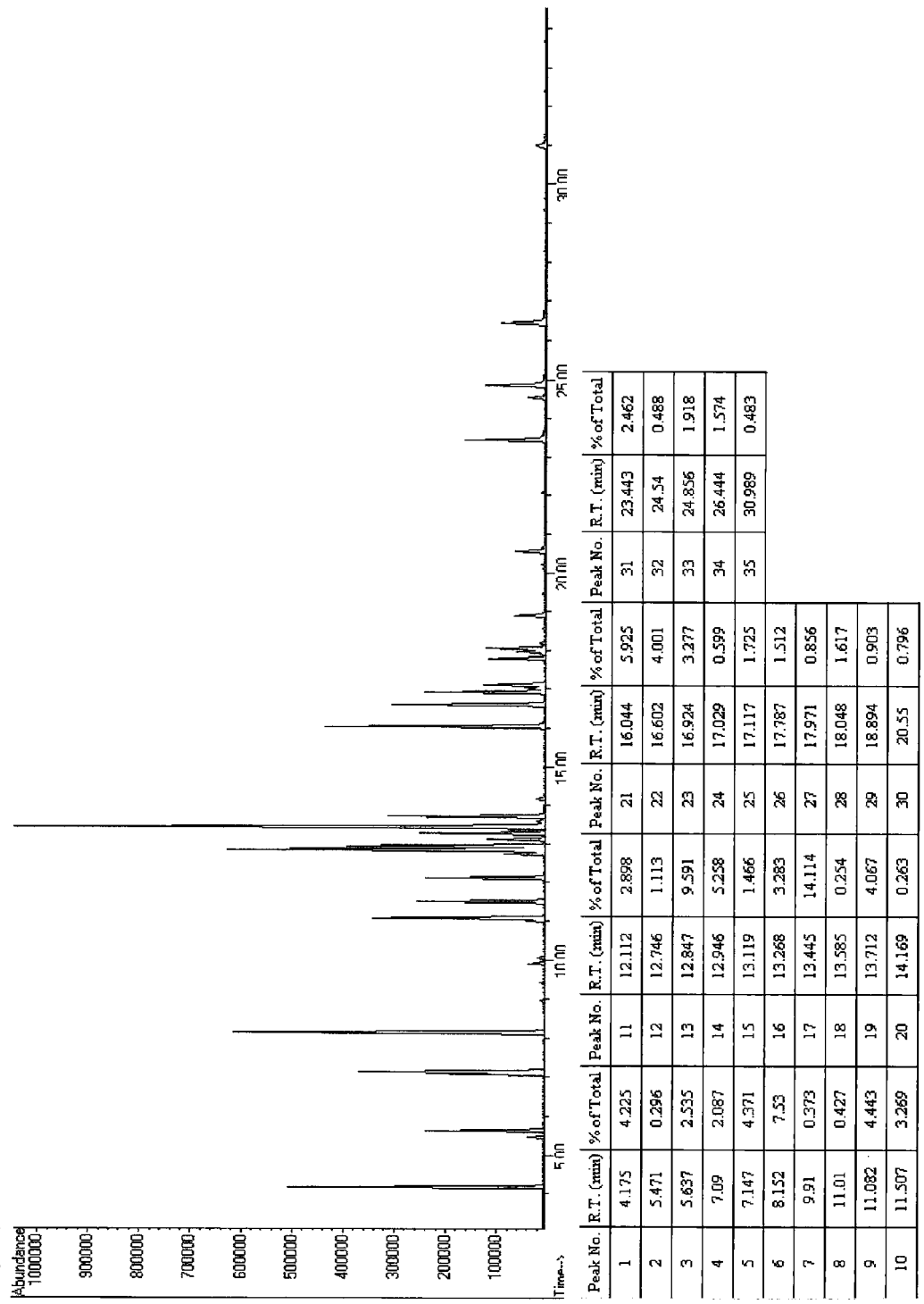
FIG. 17 illustrates the GC/MS of LC-8 consistent with the disclosed embodiments.

A liquid crystal mixture may be retrieved from waste liquid crystal display panels. After conducting separation and reformulation processes according to the present disclosure, a reformulated liquid crystal mixture, LC-8, may be obtained. The physical properties of LC-8 are shown in Table 9, and the GC/MS spectrum of LC-8 is shown in FIG. 17.

TABLE 9

Physical Properties of LC-8.

| Physical Properties | LC-8 |
|---|---|
| The number of liquid crystal compounds in the mixture | 35 |
| η (cps) | 20 |
| $T_{NI}$ (° C.) | 93.5 |
| Δn | 0.108 |
| Δε | 8.9 |

Example 8

Figure 18:
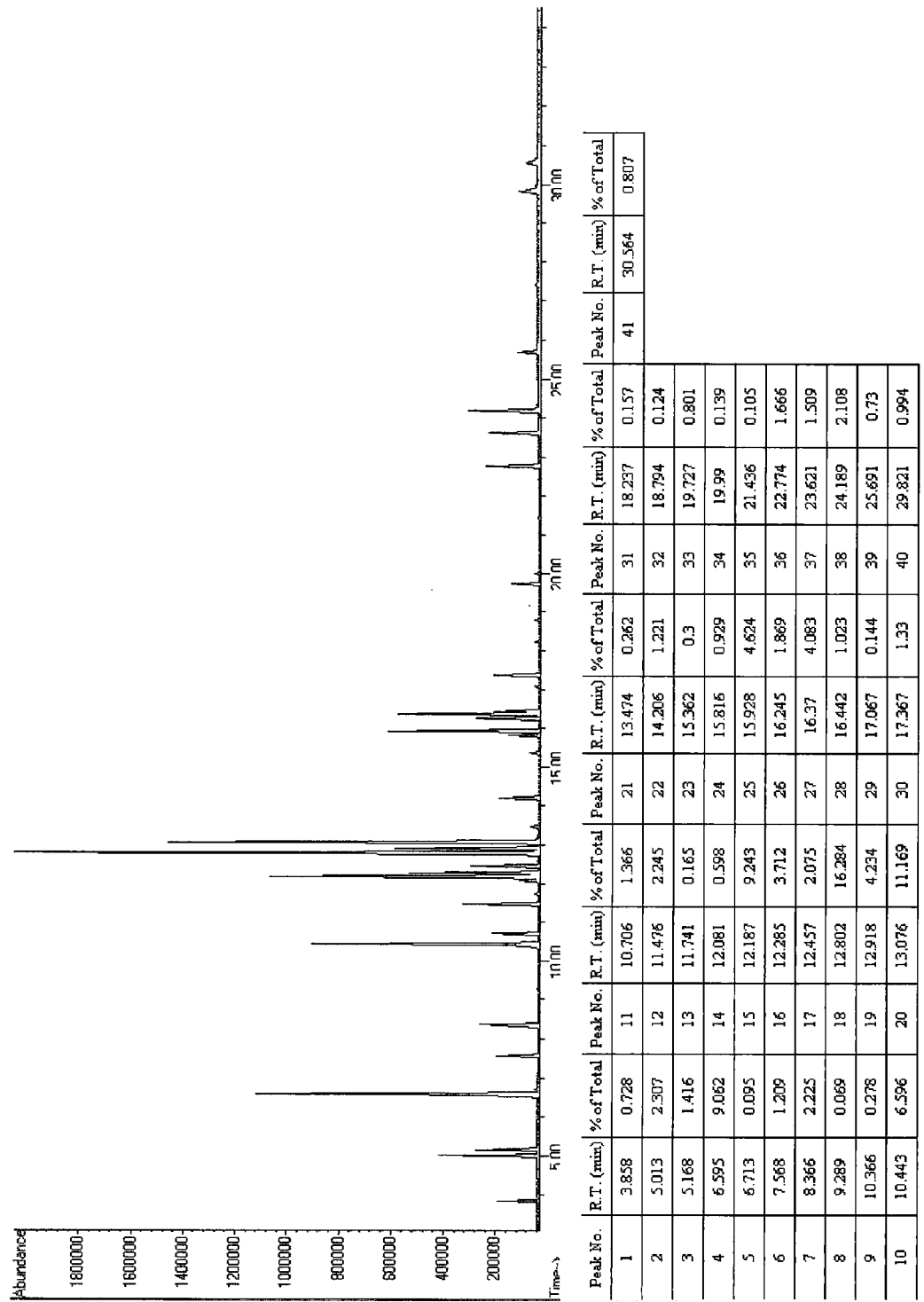
FIG. 18 illustrates the GC/MS of LC-9 consistent with the disclosed embodiments.
Figure 19:
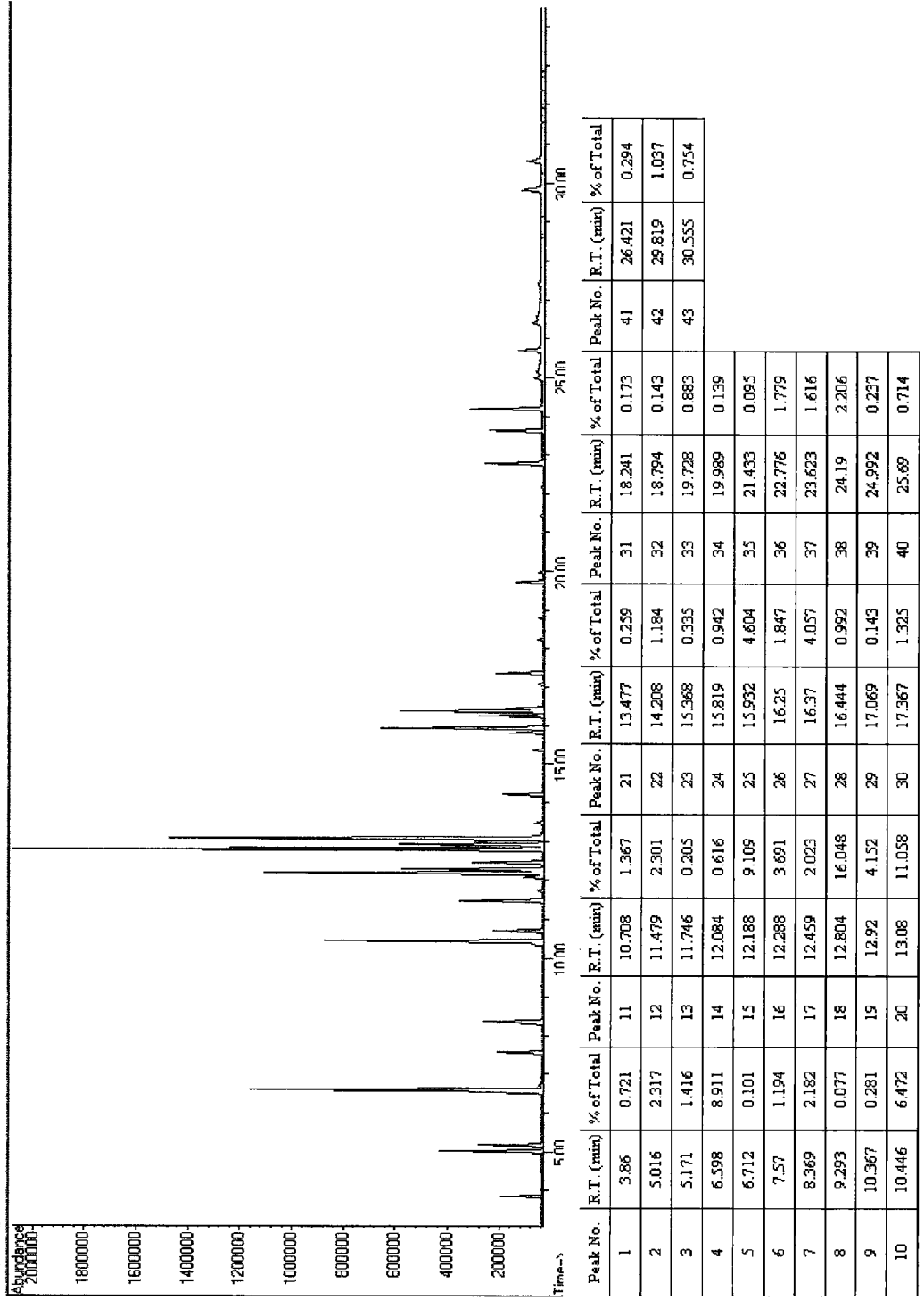
FIG. 19 illustrates the GC/MS of LC-10 consistent with the disclosed embodiments.
Figure 20:
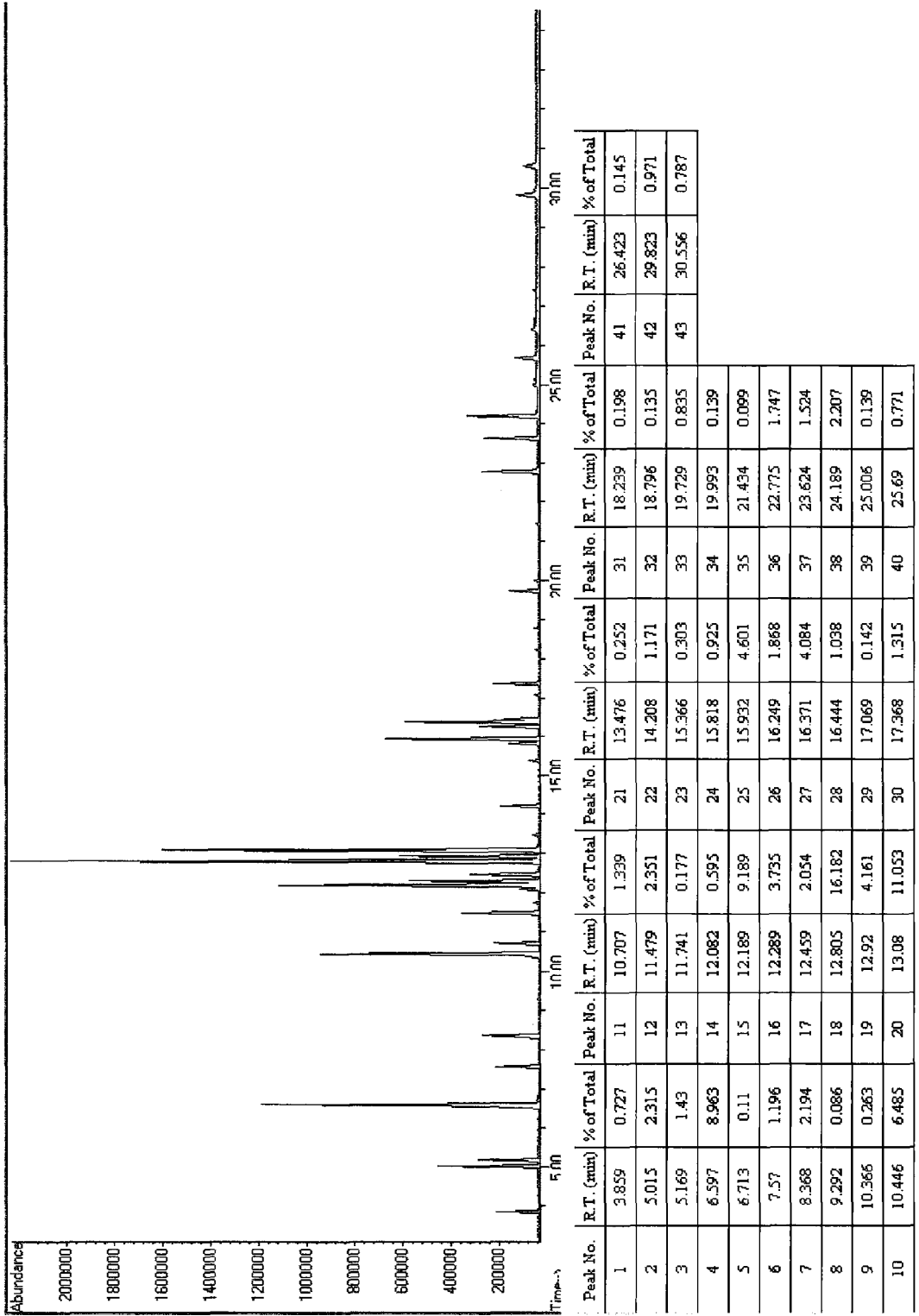
FIG. 20 illustrates the GC/MS of LC-11 consistent with the disclosed embodiments.

A liquid crystal mixture may be retrieved from waste liquid crystal display panels. After conducting separation and reformulation processes according to the present disclosure, reformulated cholesteric liquid crystal mixtures, LC-9, LC-10, and LC-11 may be obtained. The physical properties of LC-9, LC-10, and LC-11 are shown in Table 10, and the GC/MS spectrums of LC-9, LC-10, and LC-11 are shown in FIGS. 18-20.

TABLE 10

Physical Properties of LC-9, LC-10, and LC-11.

| Physical Properties | LC-9 | LC-10 | LC-11 |
|---|---|---|---|
| $\lambda_{max}$ (nm) | 635 | 548 | 450 |
| Δλ (nm) | 48 | 39 | 33 |
| $T_{NI}$ (° C.) | 88 | 87.7 | 83.8 |
| η (cps) | 34 | 35 | 38 |

$\lambda_{max}$ refers to the maximum absorption wavelength
Δλ refers to the full width at half maximum of the maximum absorption peak Table 11 summarizes the conditions or instruments used to characterize the various properties of the liquid-crystal groups described above.

TABLE 11

| Test items | Instruments (Model/Manufacturer) | Measurement Conditions | Remark |
|---|---|---|---|
| η | viscometer (CAP 1000/BROOKFIELD) | 20° C. | — |
| $T_{NI}$ | Thermal analyzer (FP900 thermal system/Mettler TOLEDO) | Heating rate: 0.1~20° C./min. | — |
| $T_{NC}$ | Freezer (B29/FIRSTEK) | −30° C. for 120 hours. | — |
| Δn | ABBA-Refractormeter (DR-M2/ATAGO) | 589 nm, 22 ± 3° C. | — |
| Δε | Liquid Crystal Analytical System (LCAS1/LC Analytical Inc.) | f = 1 kHz, V = 3.3 V, T = 22 ± 3° C. | Cell type: For positive-type LC: cell gap 4 μm with $SiO_2$ coating For negative-type LC: cell gap 4 μm with PI coating |
| V-T (V10, V50, V90) Response Time | DMS-803/Autronic-Melchers GmbH | 0-5 V(0.1 V), 60 Hz, room temp. | Cell type: cell gap 4 μm with PI coating |
| VHR | VHRM 105/Autronic-Melchers GmbH | $V_{on}$: 5 V; $V_{off}$: 0 V; 60 Hz | |
| Component analysis | GC-MS (GC 7890A and MS 5975C/Aglient) | diluted 10 times with Acetone, split ratio = 10:1 | — |

The specific order or hierarchy of steps in the processes disclosed is an illustration of exemplary approaches. Based upon design preferences, manufacturing equipment, and other considerations, the order or hierarchy of the steps may be rearranged. The accompanying method claim, therefore, does not limit the specific order or hierarchy to the order of the elements presented.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A method for recycling liquid crystal, the method comprising:
    receiving a liquid crystal mixture;
    conducting at least one separation process to separate a first liquid crystal group from the liquid crystal mixture, wherein the first liquid crystal group is separated from the liquid crystal mixture based on at least one physical characteristic chosen from flow viscosity ($\eta$), dielectric anisotropy ($\Delta\epsilon$), birefringence ($\Delta n$), clearing point ($T_{NI}$);
    conducting at least one additional separation process to separate a second liquid crystal group from the remaining of the liquid crystal mixture, wherein the second liquid crystal group is separated from the remaining of the liquid crystal mixture based on at least one physical characteristic chosen from flow viscosity ($\eta$), dielectric anisotropy ($\Delta\epsilon$), birefringence ($\Delta n$), clearing point ($T_{NI}$); and
    forming a reformulated liquid crystal mixture using the first liquid crystal group and the second liquid crystal group.

2. The method of claim 1, further comprising conducting at least one mapping process.

3. The method of claim 1, wherein the reformulated liquid crystal mixture has at least one characteristic chosen from: a $\eta$ ranging from about 2 cps to about 100 cps, a $T_{NI}$ ranging from about 70° C. to about 120° C., a $\Delta n$ ranging from about 0.06 to about 0.25, and a $\Delta\epsilon$ ranging from about 1 to about 50.

4. The method of claim 1, wherein the reformulated liquid crystal mixture has a $\Delta\epsilon$ ranging from about −1 to about −10.

5. The method of claim 1, wherein the at least one separation process comprises at least one of liquid-liquid extractions, column chromatographies, and distillations.

6. The method of claim 5, wherein the at least one separation process comprises liquid-liquid extractions, and wherein at least one of the first and the second liquid crystal groups comprises at least one liquid crystal compound having at least one $CF_2O$ bridge and in an amount ranging from about 20% to about 100% by weight, relative to the total weight of the liquid crystal group.

7. The method of claim 5, wherein the at least one separation process comprises column chromatographies, and wherein at least one of the first and the second liquid crystal groups comprises at least one liquid crystal compound having at least four cyclic rings and in an amount ranging from about 20% to about 100% by weight, relative to the total weight of the liquid crystal group.

8. The method of claim 5, wherein the at least one separation process comprises column chromatographies, and wherein at least one of the first and the second liquid crystal groups comprises at least one liquid crystal compound having at least one benzene ring and halogen atoms at the ortho and meta positions of the at least one benzene ring, further wherein the at least one liquid crystal compound is present in an amount ranging from about 50% to about 100% by weight, relative to the total weight of the liquid crystal group.

9. The method of claim 5, wherein the at least one separation process comprises low pressure distillations, and wherein at least one of the first and the second liquid crystal group comprises at least one liquid crystal compound having two or three hydrocarbon cyclic rings and in an amount ranging from about 50% to about 100% by weight, relative to the total weight of the liquid crystal group.

10. The method of claim 1, wherein at least one of the first and the second liquid crystal group comprises at least one liquid crystal compound having three cyclic rings, wherein the terminal ring of the at least one liquid crystal compound is a benzene with at least one substituent chosen from halogen group, further wherein the at least one liquid crystal compound is present in an amount ranging from about 50% to about 100% by weight, relative to the total weight of the liquid crystal group.

11. The method of claim 1, wherein the reformulated liquid crystal mixture comprises more than twenty-five liquid crystal compounds.

12. A method for recycling liquid crystal, the method comprising:
    receiving a first liquid crystal mixture and a second liquid crystal mixture;
    conducting at least one separation process to separate at least one first liquid crystal group from the first liquid crystal mixture, wherein the at least one first liquid crystal group is separated from the first liquid crystal mixture based on at least one physical characteristic;
    conducting at least one additional separation process to separate at least one second liquid crystal group from the second liquid crystal mixture; and
    forming a reformulated liquid crystal mixture using the at least one first liquid crystal group and the at least one second liquid crystal group.

13. The method of claim 12, further comprising conducting at least one mapping process.

14. A method for recycling liquid crystal, the method comprising:
    receiving a first liquid crystal mixture and a second liquid crystal mixture;
    conducting at least one separation process to separate at least one liquid crystal group from the first liquid crystal mixture, wherein the at least one liquid crystal group is separated from the first liquid crystal mixture based on at least one physical characteristic; and
    forming a reformulated liquid crystal mixture using the at least one liquid crystal group and a second liquid crystal mixture.

15. The method of claim 14, further comprising conducting at least one mapping process.

16. The method of claim 12, wherein the reformulated liquid crystal mixture has at least one characteristic chosen from: a $\eta$ ranging from about 2 cps to about 100 cps, a $T_{NI}$ ranging from about 70° C. to about 120° C., a $\Delta n$ ranging from about 0.06 to about 0.25, and a $\Delta\epsilon$ ranging from about 1 to about 50.

17. The method of claim 12, wherein the reformulated liquid crystal mixture has a $\Delta\epsilon$ ranging from about −1 to about −10.

18. The method of claim 12, wherein the at least one separation process comprises at least one of liquid-liquid extractions, column chromatographies, and distillations.

19. The method of claim 18, wherein the at least one separation process comprises liquid-liquid extractions, and wherein at least one of the first and the second liquid crystal groups comprises at least one liquid crystal compound having at least one $CF_2O$ bridge and in an amount ranging from about 20% to about 100% by weight, relative to the total weight of the liquid crystal group.

20. The method of claim 18, wherein the at least one separation comprises from column chromatographies, and wherein at least one of the first and the second liquid crystal groups comprises at least one liquid crystal compound having at least four cyclic rings and in an amount ranging from about 20% to about 100% by weight, relative to the total weight of the liquid crystal group.

21. The method of claim 18, wherein the at least one separation comprises column chromatographies, and wherein at least one of the first and the second liquid crystal groups comprises at least one liquid crystal compound having at least one benzene ring and halogen atoms at the ortho and meta positions of the at least one benzene ring, further wherein the at least one liquid crystal compound is present in an amount ranging from about 50% to about 100% by weight, relative to the total weight of the liquid crystal group.

22. The method of claim 18, wherein the at least one separation process comprises from low pressure distillations, and wherein at least one of the first and the second liquid crystal group comprises at least one liquid crystal compound having two or three hydrocarbon cyclic rings and in an amount ranging from about 50% to about 100% by weight, relative to the total weight of the liquid crystal group.

23. A method for recycling liquid crystal, the method comprising:
receiving a liquid crystal mixture;
conducting at least one separation process to separate a first liquid crystal group from the liquid crystal mixture, wherein the first liquid crystal group is separated from the liquid crystal mixture based on at least one physical characteristic;
conducting at least one additional separation process to separate a second liquid crystal group from the remaining of the liquid crystal mixture; and
forming a reformulated liquid crystal mixture using the first liquid crystal group and the second liquid crystal group.

24. The method of claim 23, wherein the at least one physical characteristic is chosen from $\eta$, $\Delta\epsilon$, $\Delta n$, and $T_{NI}$.

25. A method for recycling liquid crystal, the method comprising:
receiving a liquid crystal mixture;
conducting at least one separation process to separate a first liquid crystal group from the liquid crystal mixture, wherein the first liquid crystal group is separated from the liquid crystal mixture based on at least one physical characteristic;
conducting at least one additional separation process to separate a second liquid crystal group from the remaining of the liquid crystal mixture, wherein the second liquid crystal group is separated from the remaining of the liquid crystal mixture based on at least one physical characteristic; and
forming a reformulated liquid crystal mixture using the first liquid crystal group and the second liquid crystal group.

26. A method for recycling liquid crystal, the method comprising:
receiving a liquid crystal mixture;
conducting at least one separation process to separate a first liquid crystal group from the liquid crystal mixture, wherein the first liquid crystal group is separated from the liquid crystal mixture based on at least one first physical characteristic;
conducting at least one additional separation process to separate a second liquid crystal group from the remaining of the liquid crystal mixture, wherein the second liquid crystal group is separated from the remaining of the liquid crystal mixture based on at least one second physical characteristic; and
forming a reformulated liquid crystal mixture using the first liquid crystal group and the second liquid crystal group;
wherein the at least one first physical characteristic differs from the at least one second physical characteristic.

* * * * *